United States Patent
Noh et al.

(10) Patent No.: US 11,482,886 B2
(45) Date of Patent: Oct. 25, 2022

(54) WIRELESS CHARGING TRANSMITTER AND WIRELESS POWER TRANSFER METHOD

(71) Applicant: Samsung Electronics Co., Ltd., Gyeonggi-do (KR)

(72) Inventors: Yunjeong Noh, Gyeonggi-do (KR); Dongzo Kim, Gyeonggi-do (KR); Mincheol Ha, Gyeonggi-do (KR); Kwangseob Kim, Gyeonggi-do (KR); Kihyun Kim, Gyeonggi-do (KR); Jihye Kim, Gyeonggi-do (KR); Kyungmin Lee, Gyeonggi-do (KR); Wooram Lee, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 16/784,432

(22) Filed: Feb. 7, 2020

(65) Prior Publication Data

US 2020/0266665 A1 Aug. 20, 2020

(30) Foreign Application Priority Data

Feb. 19, 2019 (KR) .................. 10-2019-0019493

(51) Int. Cl.
*H02J 7/00* (2006.01)
*H02J 50/12* (2016.01)
*H02J 7/02* (2016.01)

(52) U.S. Cl.
CPC .......... *H02J 50/12* (2016.02); *H02J 7/00045* (2020.01); *H02J 7/00712* (2020.01); *H02J 7/02* (2013.01)

(58) Field of Classification Search
USPC .................................. 320/106–115
See application file for complete search history.

(56) References Cited

U.S. PATENT DOCUMENTS

2011/0136550 A1* 6/2011 Maugars .......... H02J 50/40 455/573
2013/0127410 A1 5/2013 Park et al.
(Continued)

FOREIGN PATENT DOCUMENTS

EP 3457517 A2 3/2019
KR 10-2012-0133306 A 12/2012
(Continued)

OTHER PUBLICATIONS

European Search Report dated Apr. 6, 2020.
International Search Report dated May 15, 2020.

*Primary Examiner* — Binh C Tat
(74) *Attorney, Agent, or Firm* — Cha & Reiter, LLC

(57) ABSTRACT

One or more disclosed embodiments relate to a wireless charging transmitter and a wireless power transfer method. The wireless charging transmitter includes a first charging pad including a first wireless power circuit, a second charging pad including a second wireless power circuit, and a controller configured to, in response to detection of a first electronic device being placed on the first charging pad, transfer power at a first designated wireless power level via the first wireless power circuit, in response to detection of a second electronic device being placed on the second charging pad, transmit a first command for decreasing power transferred to the first electronic device, and transfer, upon receipt of a first request for power at a second designated wireless power level from the first electronic device in response to the first command, the power at the second (Continued)

designated wireless power level via the first and second wireless power circuits. The disclosure may further include other various embodiments.

6 Claims, 12 Drawing Sheets

(56) References Cited

U.S. PATENT DOCUMENTS

| | | |
|---|---|---|
| 2015/0115885 A1 | 4/2015 | Carobolante |
| 2016/0294220 A1 | 10/2016 | Kwon et al. |
| 2017/0338684 A1 | 11/2017 | Mishriki et al. |
| 2017/0357337 A1* | 12/2017 | Chou .................... H02J 7/0042 |
| 2018/0226842 A1 | 8/2018 | Uchida et al. |
| 2018/0351415 A1* | 12/2018 | Masquelier ........... B60L 53/122 |
| 2019/0006890 A1 | 1/2019 | Tanaka |
| 2019/0140469 A1 | 5/2019 | Lee |
| 2019/0260241 A1 | 8/2019 | Park |

FOREIGN PATENT DOCUMENTS

| | | |
|---|---|---|
| KR | 10-1752250 B1 | 7/2017 |
| KR | 10-2018-0108174 A | 10/2018 |
| KR | 10-2019-0000363 A | 1/2019 |
| WO | 2017/195977 A2 | 11/2017 |

\* cited by examiner

WIRELESS CHARGING TRANSMITTER AND WIRELESS POWER TRANSFER METHOD

CROSS-REFERENCE TO RELATED APPLICATION(S)

This application is based on and claims priority under 35 U.S.C. 119 to Korean Patent Application No. 10-2019-0019493 filed on Feb. 19, 2019, in the Korean Intellectual Property Office, the disclosures of which are herein incorporated by reference in their entireties.

TECHNICAL FIELD

One or more disclosed embodiments generally relate to a wireless charging transmitter and a wireless power transfer method.

BACKGROUND

Recently, wireless or contactless charging technologies have been developed and applied to various types of electronic devices.

These wireless charging technologies make it possible to charge electronic devices such as smartphones and wearable devices by just placing them on a charging pad or cradle without requiring a physical and electrical contact between the batteries of the electronic devices and the charger.

SUMMARY

An example of a wireless charging transmitter may include multiple charging pads for charging multiple electronic devices simultaneously. Hereinafter, these electronic devices being charged may be referred to as wireless charging receivers.

However, the maximum transfer power of a conventional wireless charging transmitter is limited by the input power supplied from an external power device (e.g., travel adapter or AC power supply). This may prevent the wireless charging transmitter from supplying sufficient charging powers required by multiple electronic devices.

According to an disclosed embodiment, a wireless charging transmitter includes a first charging pad including a first wireless power circuit, a second charging pad including a second wireless power circuit, and a controller electrically connected to the first and second wireless power circuits and configured to, in response to detection of a first electronic device being placed on the first charging pad, transfer, after an authentication procedure with the first electronic device for a designated protocol is completed, power at a first designated wireless power level via the first wireless power circuit, in response to detection of a second electronic device being placed on the second charging pad while the power at the first designated wireless power level is being transferred via the first wireless power circuit, transmit a first command for decreasing power transferred to the first electronic device, where the second electronic device requests a same or similar amount of power as the first electronic device, and transfer, upon receipt of a first request for power at a second designated wireless power level from the first electronic device in response to the first command, the power at the second designated wireless power level via the first and second wireless power circuits.

According to an disclosed embodiment, a wireless charging transmitter includes a first charging pad including a first wireless power circuit, a second charging pad including a second wireless power circuit, and a controller electrically connected to the first and second wireless power circuits and configured to, in response to detection of a wireless charging receiver on the second charging pad, transmit power at a designated wireless power level requested by the wireless charging receiver placed on the second charging pad via the second wireless power circuit regardless of whether another wireless charging receiver is placed on the first charging pad, and in response to detection of a first electronic device being placed on the first charging pad, transmit a command requesting adjustment of a wireless charging power to the first electronic device when the wireless charging receiver is placed on the second charging pad.

According to an disclosed embodiment, a wireless power transfer method of a wireless charging transmitter including a first charging pad including a first wireless power circuit and a second charging pad including a second wireless power circuit includes, in response to detection of a wireless charging receiver being placed on the second charging pad, transmitting power at a designated wireless power level requested by the wireless charging receiver to the second charging pad via the second wireless power circuit regardless of whether another wireless charging receiver is placed on the first charging pad; and in response to detection of a first electronic device being placed on the first charging pad, transmitting a command requesting adjustment of a wireless charging power to the first electronic device when the wireless charging receiver is placed on the second charging pad.

According to an disclosed embodiment, an electronic device includes a battery, a coil, a receiving circuit electrically connected to the coil, a charger configured to control a charging state of the battery based on a voltage supplied to the receiving circuit, and a processor electrically connected to the receiving circuit and the charger and configured to, in response to detection of the electronic device being solitarily placed on a wireless charging transmitter with multiple charging pads, wirelessly charge with power at a first designated wireless power level based on a result of an authentication procedure performed with the wireless charging transmitter for a designated protocol, receive a first command for decreasing power from the wireless charging transmitter while being charged with the power at the first designated wireless power level, and in response to receipt of the first command, transmit a request to change the power transferred to the electronic device from at the first designated wireless power level to a second designated wireless power level lower than the first designated wireless power level to the wireless charging transmitter.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

In the drawings, the same or similar reference numerals may be used for the same or similar components.

DETAILED DESCRIPTION

One or more disclosed embodiments provide a wireless charging transmitter and a method for facilitating and stabilizing wireless charging by determining a receiving power level of an electronic device based on at least the presence/absence of an electronic device placed on a charging pad, the type of the electronic device placed on the charging pad, and the headroom of available power.

Figure 1:
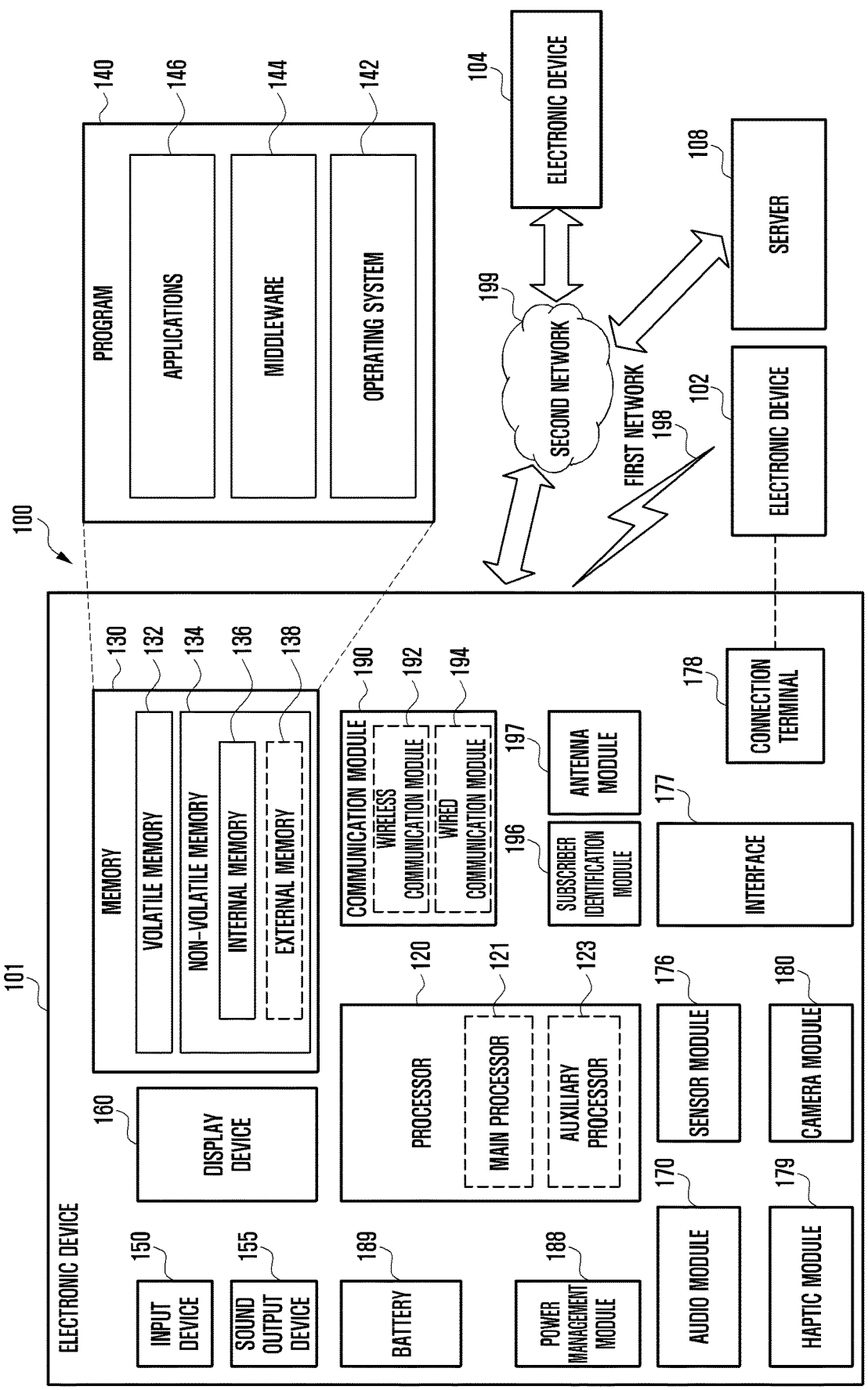
FIG. 1 is a block diagram illustrating an electronic device in a network environment according to a disclosed embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
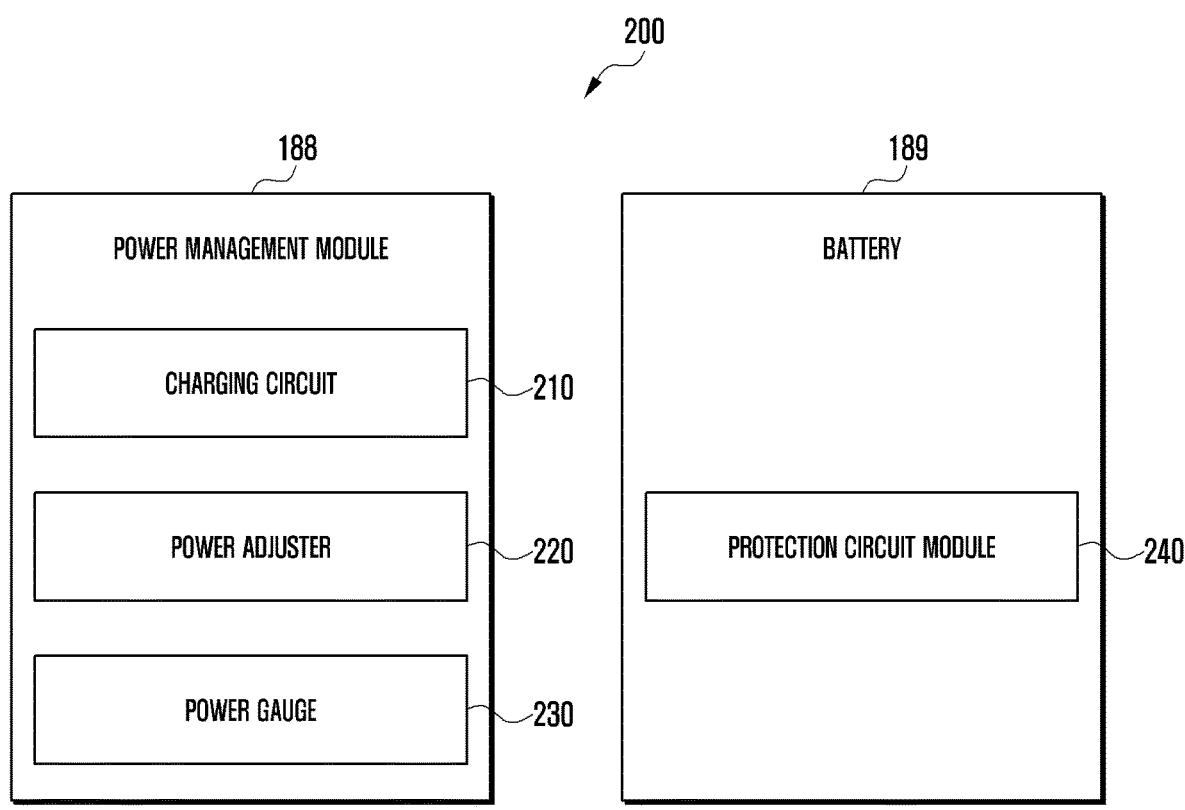
FIG. 2 is a block diagram illustrating a power management module and a battery according to a disclosed embodiment.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be configured as part of the PCM 240, or may be disposed near the battery 189 as a separate device.

Figure 3:
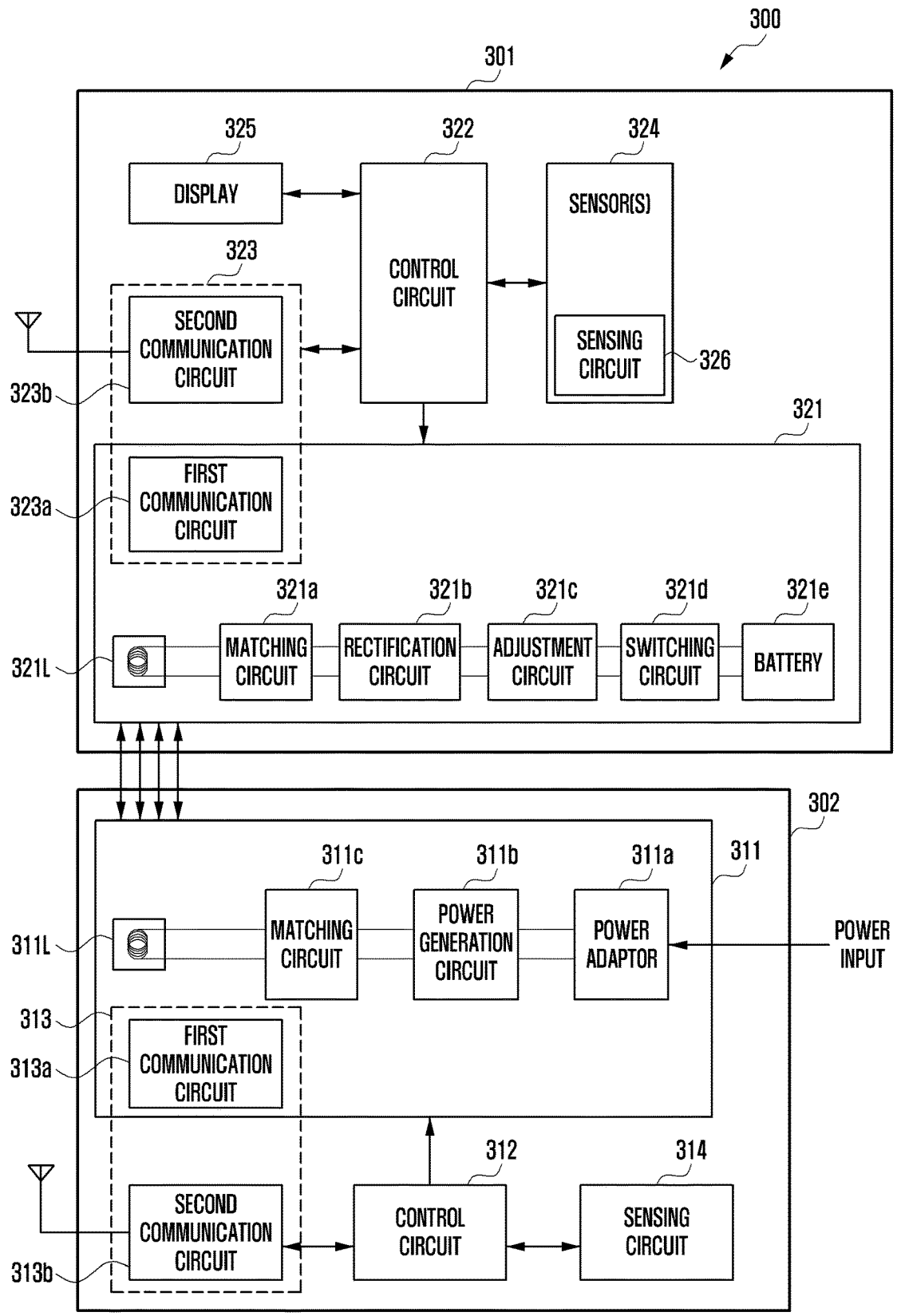
FIG. 3 is a diagram illustrating a configuration of a wireless charging system according to a disclosed embodiment.

FIG. 3 is a diagram illustrating a configuration of a wireless charging system 300 according to an embodiment.

In the embodiment of FIG. 3, an external electronic device 302 (e.g., electronic device 102 in FIG. 1) (hereinafter, referred to as power transmitting device) may supply power wirelessly to another electronic device 301 (e.g., electronic device 101 in FIG. 1) (hereinafter, referred to as power receiving device). The external electronic device 302 may be an electronic device operating as a wireless charging transmitter or in a power transfer mode. According to an embodiment, the external electronic device 302 may be identical in configuration or be similar to the electronic device 102 depicted in FIG. 1. The electronic device 301 may be identical in configuration or be similar to the electronic device 101 depicted in FIG. 1.

According to an embodiment, the power transmitting device 302 may include a power transfer circuit 311, a controller or control circuit 312, a communication circuit 313, or a sensing circuit 314.

According to an embodiment, the power transfer circuit 311 may include a power adaptor 311a for receiving external power or electricity (e.g. from an outlet) and converting the voltage of the input power appropriately, a power generating circuit 311b for generating power, a transmit coil 311L for transmitting power wirelessly and/or a matching circuit 311c for maximizing efficiency between a transmit coil 311L and a receive coil 321L.

According to an embodiment, the power transfer circuit 311 may include multiple sets of the power adaptor 311a, the power generating circuit 311b, the transmit coil 311L, and/or the matching circuit 311c for transferring power to multiple power receiving devices.

According to an embodiment, the control circuit 312 may control operations of the power transmitting device 302 and generate various messages necessary for wireless power transfer to the communication circuit 313. In an embodiment, the control circuit 312 may calculate power (or electric energy) to be transferred to the power receiving device 301 based on information received from the communication circuit 313. In an embodiment, the control circuit 312 may control the power transfer circuit 311 to transfer the power generated by the transmit coil 311L to the power receiving device 301.

According to an embodiment, the communication circuit 313 may include at least one of a first communication circuit 313a or a second communication circuit 313b. For example, the first communication circuit 313a may communicate with a first communication circuit 323a of the power receiving device 301 in a frequency identical or close to the frequency in use by the transmit coil 311L for power transfer. This may be referred to as in-band communication.

The first communication circuit 313a may communicate with the first communication circuit 323a using the transmit coil 311L. The data (or communication signal) generated by the first communication circuit 313a may be transmitted using the transmit coil 311L. The first communication circuit 313a may transmit data to the power receiving device 301 using a frequency shift keying (FSK) modulation scheme. According to an embodiment, the first communication circuit 313a may communicate with the first communication circuit 323a of the power receiving device 301 through frequency conversion of the power signal received via the transmit coil 311L. The first communication circuit 313a may communicate with the first communication circuit 323a of the power receiving device 301 in such a way that data is included in the power signal generated by the power generating circuit 311b. For example, the first communication circuit 313a may transmit data by frequency-modulating the power transfer signal.

In an embodiment, the second communication circuit 313b may communicate with a second communication circuit 323b of the power receiving device 301 using a frequency different from the frequency in use by the transmit coil 311L for power transfer. This may be referred to as outband communication or outband mode. For example, the second communication circuit 313b may acquire charging status information of the electronic device 301 (e.g., voltage value after rectification or rectified voltage value (e.g., Vrec) information, information on current flowing over a coil or rectifying circuit (e.g., Iout), various kinds of packets, and messages) from the second communication circuit 323b using various short range communication protocols such as Bluetooth, Bluetooth Low Energy (BLE), wireless fidelity (Wi-Fi), and near field communication (NFC).

According to an embodiment, the sensing circuit 314 may include at least one sensor for sensing at least one status of the power transmitting device 302.

According to an embodiment, the sensing circuit 314 may include at least one of a temperature sensor for sensing the temperature of the power transmitting device 302, a motion sensor for sensing motion of the power transmitting device 302, or an electric current (or voltage) sensor for sensing status of an output signal of the power transmitting device 302 (such as size of electric current, voltage, or power).

According to an embodiment, the current (or voltage) sensor may measure the signal output from the power transfer circuit 311, such as the signal output from the matching circuit 311c or the power generating circuit 311b. Alternatively, the current (or voltage) sensor may include a circuit for measuring current or voltage at the front end of the coil 311L.

According to an embodiment, the sensing circuit 314 may include a circuit for foreign object detection (FOD).

According to an embodiment, the power receiving device 301 (e.g., electronic device 101 in FIG. 1) may include a power receive circuit 321 (e.g., power management module 188 in FIG. 1), a control circuit 322 (e.g., processor 120 in FIG. 1), a communication circuit 323 (e.g., communication module 190 in FIG. 1), at least one sensor 324 (e.g., sensor module 176 in FIG. 1), a display 325 (e.g., display device 160 in FIG. 1), or a sensing circuit 326. Description of components in the power receiving device 301 that correspond to some components of the power transmitting device 302 may be omitted herein for simplicity. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the power receive circuit 321 may include a receive coil 321L for receiving power wirelessly from the power transmitting device 302, a matching circuit 321a for maximizing efficiency between a transmit coil 311L and a receive coil 321L, a rectification circuit 321b for rectifying received AC power to DC power, an adjustment circuit 321c for adjusting charging voltage, a switch circuit 321d, and/or a battery 321e (e.g., battery 189).

According to an embodiment, the control circuit 322 may control operations of the power receiving device 301 and generate various messages necessary for wireless power transfer to the communication circuit 323.

According to an embodiment, the communication circuit 323 may include at least one of a first communication circuit 323a or a second communication circuit 323b. The first communication circuit 323a may communicate with the power transmitting device 302 via the receive coil 321L.

The first communication circuit 323a may communicate with the first communication circuit 313a using the receive coil 321L. The data (or communication signal) generated by the first communication circuit 323a may be transmitted using the receive coil 321L. The first communication circuit 323a may transmit the data to the power transmitting device 302 using the amplitude shift keying (ASK) modulation scheme. The second communication circuit 323b may communicate with the power transmitting device 302 using at least one of various short range communication protocols such as Bluetooth, BLE, Wi-Fi, and NFC.

According to an embodiment, the at least one sensor 324 may include an electric current/voltage sensor, a temperature sensor, an illuminance sensor, or an acceleration sensor.

According to an embodiment, the display 325 may display various content such as information related to the wireless transmitting and receiving of power.

According to an embodiment, the sensing circuit 326 may detect the power transmitting device 302 based on a power signal or power from the power transmitting device 302. The sensing circuit 326 may detect changes in signals at the input/output terminals of the coil 321L, the matching circuit 321a, or the rectification circuit 321b. According to another embodiment, the sensing circuit 326 may be included in the power receive circuit 321.

Figure 4:
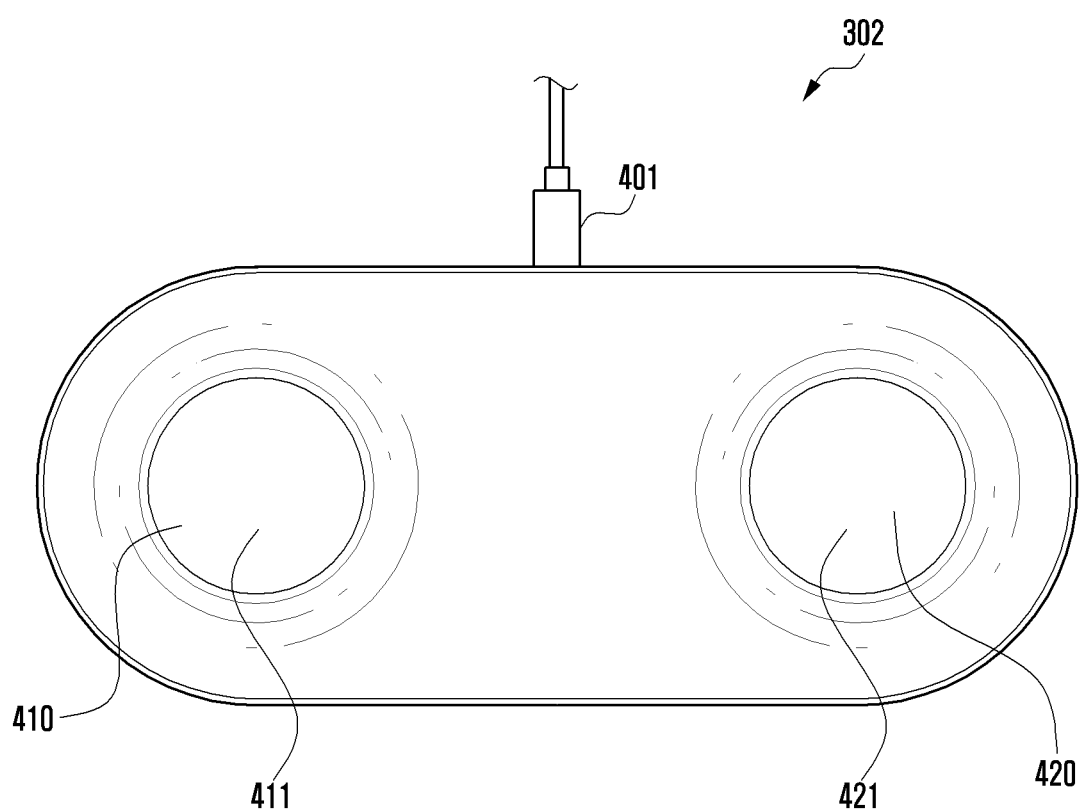
FIG. 4 is a top plan view illustrating a wireless charging transmitter according to a disclosed embodiment.

FIG. 4 is a top plan view illustrating a wireless charging transmitter according to an embodiment. For example, FIG. 4 may be a top plan view of first and second charging pads 410 and 420 of a wireless charging transmitter according to an embodiment.

In the embodiment of FIG. 4, the wireless charging transmitter 302 (e.g., electronic device 102 in FIG. 1) may include multiple charging pads and receive power from an external power device (e.g., travel adapter or AC power supply) via an input terminal 401.

According to an embodiment, the wireless charging transmitter 302 may include at least first charging pad 410 and second charging pad 420. If the wireless charging transmitter 302 detects that an external electronic device is placed on the first charging pad 410 or the second charging pad 420, it may transmit power required by the external electronic device via a first wireless power circuit 411 of the first charging pad 410 or a second wireless power circuit 421 of the second charging pad 420.

According to an embodiment, the first charging pad 410 includes a first wireless power circuit 411, which transfers wireless charging power at up to a first designated wireless power level under the control of the control circuit 312 of the wireless charging transmitter 302. The second charging pad 420 includes a second wireless power circuit 421, which transfers wireless charging power at up to a second designated wireless power level under the control of the control circuit 312 of the wireless charging transmitter 302. According to an embodiment, the second designated wireless power level may be lower than the first designated wireless power level. For example, the second designated wireless power level may correspond to normal wireless charging or fast wireless charging, and the first designated wireless power level may correspond to ultra-fast wireless charging.

Figure 5:
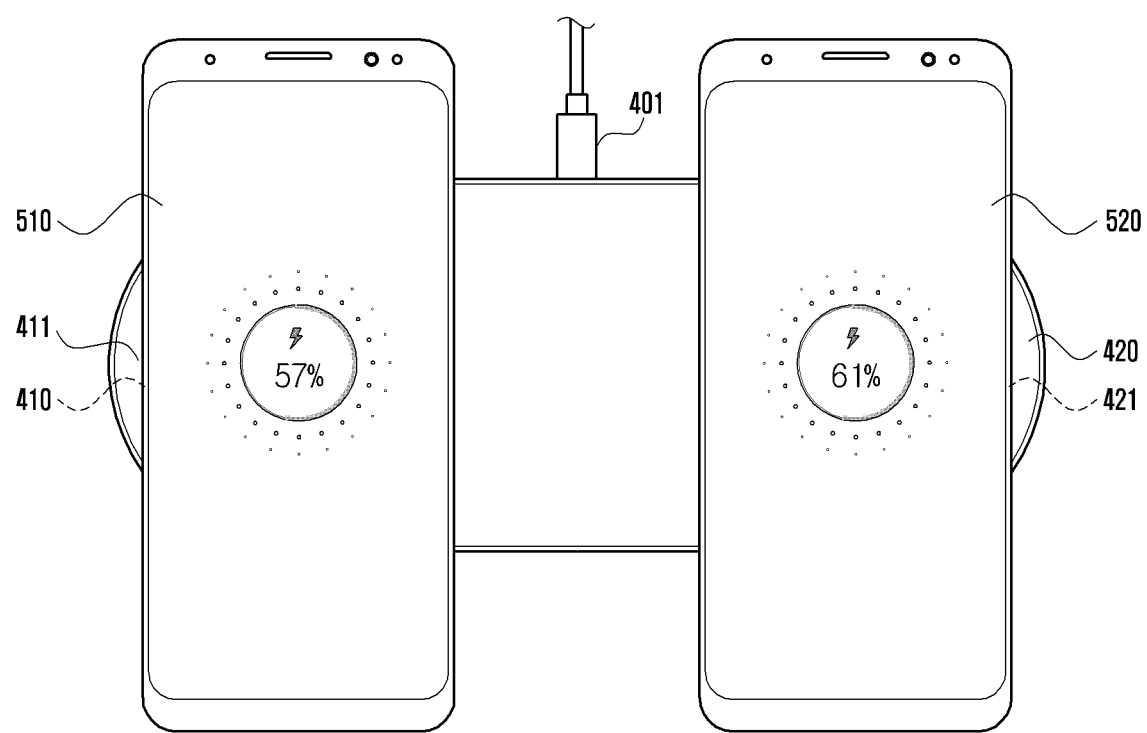
FIG. 5 is a top plan view illustrating a situation where the wireless charging transmitter is charging similar electronic devices according to a disclosed embodiment.

FIG. 5 is a top plan view illustrating a situation where the wireless charging transmitter 302 is charging similar electronic devices according to an embodiment.

In the embodiment of FIG. 5, the wireless charging transmitter 302 (e.g., electronic device 102 in FIG. 1) may charge similar electronic devices simultaneously. In this example, both devices 510 and 520 being simultaneously charged by the first charging pad 410 and the second charging pad 420, respectively, may be portable terminals such as smartphones. Here, similar electronic devices may mean devices belonging to the same class (i.e. smartphones). Devices belonging to the same class may request the same or similar amount of power from the wireless charging transmitter 302.

According to an embodiment, the control circuit 312 of the wireless charging transmitter 302 may adjust the wireless power based on wireless charging configurations of the first external electronic device 510 and/or the second external electronic device 520. For example, the wireless charging transmitter 302 may exchange identity information with the first external electronic device 510 and the second external electronic device 520 via the wireless charging circuit and adjust the wireless power based thereon.

According to an embodiment, the first and second external electronic devices 510 and 520 may each be an electronic device requiring relatively high power. For example, the first external electronic device 510 or the second external electronic device 520 may be charged via normal wireless charging or fast wireless charging, which requires more power than normal wireless charging. According to an embodiment, the first external electronic device 510 or the second external electronic device 520 may be charged in a particular range of power. According to an embodiment, the first external electronic device 510 or the second external electronic device 520 may be charged via ultra-fast wireless charging that requires even more power than fast wireless charging.

According to an embodiment, the control circuit 312 of the wireless charging transmitter may transfer information related to a designated wireless power corresponding to the type of the first external electronic device 510 or the second external electronic device 520 based on the wireless charging configuration of the first external electronic device 510 or the second external electronic device 520. For example, the first external electronic device 510 or the second external electronic device 520 may perform in-band communication with the wireless charging transmitter 302 according to a designated standard (e.g., wireless power consortium (WPC) standard) to exchange information necessary for wireless power transfer. According to the WPC standard, wireless charging may include a ping phase, an identification & configuration phase, and a power transfer phase. According to an embodiment, in the ping phase, a determination is made on whether the first external electronic device 510 or the second external electronic device 520 is placed on the charging pad, e.g., whether the first external electronic device 510 or the second external electronic device 520 is near the wireless charging transmitter 302. According to an embodiment, in the identification & configuration phase, the wireless charging transmitter 302 and the first external electronic device 510 or the second external electronic device 520 together determine a power transfer amount through in-band communication, e.g., the first external electronic device 510 or the second external electronic device 520 determines their designated wireless power to be transferred by the wireless charging transmitter 302. According to an embodiment, in the power transfer phase, the designated wireless power is transferred, e.g., the wireless charging transmitter 302 transfers the determined wireless power (e.g., power corresponding to normal wireless charging) to the first external electronic device 510 or the second external electronic device 520.

According to an embodiment, the control circuit 312 of the wireless charging transmitter 302 may adjust the wireless power based on the type of the first external electronic device 510 and/or the second external electronic device 520.

According to an embodiment, if both the first and second external electronic devices 510 and 520 request relatively high wireless charging power, the control circuit 312 of the wireless charging transmitter 302 may control the first charging pad 410 to supply wireless power at the second designated wireless power level which is lower than the first designated wireless power level. According to an embodiment, upon detecting that the first and second external electronic devices 510 and 520 are simultaneously placed on the charging pads, the control circuit 312 of the wireless charging transmitter 302 may transmit a command requesting wireless charging at the second designated wireless power level rather than the first designated wireless power level for both the first external electronic device 510 and the second external electronic device 520. As a consequence, the first external electronic device 510 or the second external electronic device 520 may be wirelessly charged at the second designated wireless power level.

Figure 6:
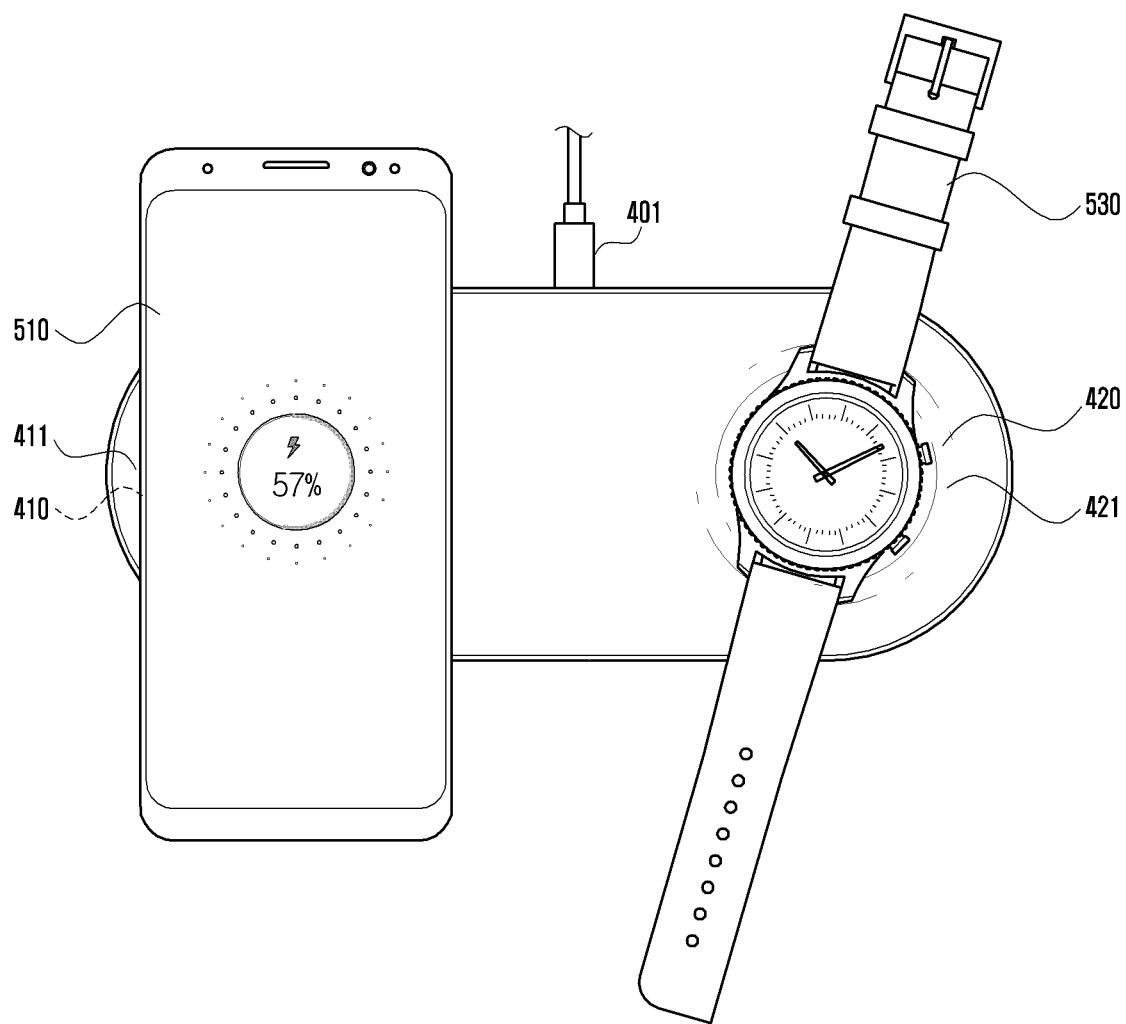
FIG. 6 is a top plan view illustrating a situation where the wireless charging transmitter 302 is charging different electronic devices simultaneously according to an embodiment.

FIG. 6 is a top plan view illustrating a situation where the wireless charging transmitter 302 is charging different electronic devices simultaneously according to an embodiment.

In the embodiment of FIG. 6, the wireless charging transmitter 302 may charge different electronic devices simultaneously. Here, different electronic devices may mean devices belonging to different classes (e.g. a smartphone versus a wearable device). Devices belonging to different classes may request different amounts of power from the wireless charging transmitter 302. For example, the wireless charging transmitter 302 may detect a first external electronic device 510 to be a portable terminal and being placed on the first charging pad 410 and a third external electronic device 530 to be a wearable device and being placed on the second charging pad 420. Accordingly, it may configure wireless power at different power levels to be supplied simultaneously to the first and third external electronic devices 510 and 530. For example, the wireless charging transmitter 302 may supply a first designated wireless power level to the first external electronic device 510 and a third designated wireless power level lower than a second designated wireless power level to the third external electronic device 530.

According to an embodiment, the first external electronic device 510 may be capable of being charged at relatively high power, and the third external electronic device 530 may only be capable of being charged at relatively low power. According to an embodiment, the control circuit 312 of the wireless charging transmitter 302 may transfer power at designated wireless power levels corresponding to the type the first external electronic device 510 or the third external electronic device 530. For example, the first external electronic device 510 or the third external electronic device 530 may perform in-band communication with the wireless charging transmitter 302 according to a designated standard (e.g., WPC standard) as part of the wireless charging configuration operation. In this operation, information necessary for wireless power transfer is exchanged.

According to a disclosed embodiment, the wireless charging transmitter 302 includes a first charging pad 410 having a first wireless power circuit 411, a second charging pad 420 having a second wireless power circuit 421, and a control circuit 312 electrically connected to the first and second wireless power circuits 411 and 421, the control circuit 312 being configured to, in response to detection of a first electronic device being placed on the first charging pad, transfer, after an authentication procedure with the first electronic device for a designated protocol is completed, power at a first designated wireless power level via the first wireless power circuit, in response to detection of a second electronic device being placed on the second charging pad while the power at the first designated wireless power level is being transferred via the first wireless power circuit, transmit a first command for decreasing power transferred to the first electronic device, where the second electronic device requests a same or similar amount of power as the first electronic device, and transfer, upon receipt of a first request for power at a second designated wireless power level from the first electronic device in response to the first command, the power at the second designated wireless power level via the first and second wireless power circuits. The control circuit 312 may be further configured to, in response to detection of a detachment of the second electronic device while the power at the second designated wireless power level is being transferred via the first and second wireless power circuits, transmit a second command for increasing power transferred to the first electronic device, and transfer, upon receipt of a second request for the power at the first designated wireless power level from the first electronic device in response to the second command, the power at the first designated wireless power level via the first wireless power circuit. The control circuit 312 may be further configured to detect a third electronic device replacing the second electronic device on the second charging pad while the power at the first designated wireless power level is being transferred via the first wireless power circuit, maintain the transfer of the power at the first designated wireless power level via the first wireless power circuit, and transfer power at a third designated wireless power level lower than the second designated wireless power level via the second wireless power circuit. The control circuit 312 may be further configured to, in response to detection of the second electronic device being solitarily placed on the second charging pad, transfer the power at the second designated wireless power level via the second wireless power circuit, in response to detection of the first electronic device being placed on the first charging pad while the power at the second designated wireless power level is being transferred via the second wireless power circuit, transmit a third command requesting transfer of the power at the second designated wireless power level to the first electronic device, and transfer, upon receipt of a third request for the power at the second designated wireless power level from the first electronic device in response to the third command, the power at the second designated wireless power level via the first and second wireless power circuits According to a disclosed embodiment, the wireless charging transmitter 302 includes a first charging pad 410 having a first wireless power circuit 411, a second charging pad 420 having a second wireless power circuit 421, and a control circuit 312 electrically connected to the first and second wireless power circuits 411 and 421, the control circuit 312 being configured to, in response to detection of a wireless charging receiver on the second charging pad, transfer power at a designated wireless power level requested by the wireless charging receiver placed on the second charging pad via the second wireless power circuit regardless of whether another wireless charging receiver is placed on the first charging pad, and in response to detection of a first electronic device being placed on the first charging pad, transmit a command requesting adjustment of a wireless charging power to the first electronic device when the wireless charging receiver is placed on the second charging pad. The control circuit 312 may be further configured to, when the first electronic device is solitarily placed on the first charging pad, transfer, after an authentication procedure with the first electronic device for a designated protocol is completed, power at a first designated wireless power level via the first wireless power circuit, in response to detection of a second electronic device being placed on the second charging pad while the power at the first designated wireless power level is being transferred via the first wireless power circuit, transmit a first command for decreasing power transferred to the first electronic device, where the second electronic device requests a same or similar amount of power as the first electronic device, and transfer, upon receipt of a first request for power at a second designated wireless power level from the first electronic device in response to the first command, the power at the second designated wireless power level via the first and second wireless power circuits. The control circuit 312 may be further configured to, in response to detection of a detachment of the second electronic device while the power at the second designated wireless power level is being transferred via the first and second wireless power circuits, transmit a second command for increasing power transferred to the first electronic device, and transfer, upon detection of a second request for the power at the first designated wireless power level from the first electronic device in response to the second command, the power at the first designated wireless power level via the first wireless power circuit. The control circuit 312 may be further configured to detect a third electronic device replacing the second electronic device on the second charging pad while the power at the first designated wireless power level is being transferred via the first wireless power circuit, maintain the transfer of the power at the first designated wireless power level via the first wireless power circuit, and transfer power at a third designated wireless power level via the second wireless power circuit. The control circuit 312 may be further configured to, in response to detection of the second electronic device being solitarily placed on the second charging pad, transfer the power at the second designated wireless power level via the second wireless power circuit, in response to detection of the first electronic device being placed on the first charging pad while the power at the second designated wireless power level is being transferred via the second wireless power circuit, transmit a third command requesting transfer of the power at the second designated wireless power level to the first electronic device, and transfer, upon receipt of a third request for the power at the second designated wireless power level from the first electronic device in response to the third command, the power at the second designated wireless power level via the first and second wireless power circuits.

According to a disclosed embodiment, an electronic device (e.g. first electronic device 510) may include a battery, a coil, a receiving circuit connected electrically to the coil, a charger controlling a charging status of the battery based on voltage supplied from the receiving circuit, and a processor connected operationally to the receiving circuit and the charger, the processor being configured to, in response to detection of the electronic device being solitarily placed on a wireless charging transmitter with multiple charging pads, wirelessly charge with power at a first designated wireless power level based on a result of an authentication procedure performed with the wireless charging transmitter for a designated protocol, receive a first command for decreasing power from the wireless charging transmitter while being charged with the power at the first designated wireless power level, and in response to receipt of the first command, transmit a request to change the power transferred to the electronic device from at the first designated wireless power level to a second designated wireless power level lower than the first designated wireless power level to the wireless charging transmitter.

The wireless power transfer method of the wireless charging transmitter 302 including the first charging pad 410 including the first wireless power circuit 411 and the second charging pad 420 including the second wireless power circuit 421 may include, in response to detection of a wireless charging receiver being placed on the second charging pad, transmitting power at a designated wireless power level requested by the wireless charging receiver to the second charging pad via the second wireless power circuit regardless of whether another wireless charging receiver is placed on the first charging pad; and in response to detection of a first electronic device being placed on the first charging pad, transmitting a command requesting adjustment of a wireless charging power to the first electronic device when the wireless charging receiver is placed on the second charging pad. The method may include, when the first electronic device is solitarily placed on the first charging pad, transferring, after an authentication procedure with the first electronic device for a designated protocol is completed, power at a first designated wireless power level via the first wireless power circuit; in response to detection of a second electronic device being placed on the second charging pad while the power at the first designated wireless power level is being transferred via the first wireless power circuit, transmitting a first command for decreasing power transferred to the first electronic device, where the second electronic device requests a same or similar amount of power as the first electronic device; and transferring, upon receipt of a first request for power at a second designated wireless power level from the first electronic device in response to the first command, the power at the second designated wireless power level via the first and second wireless power circuits. The method may include, in response to detection of a detachment of the second electronic device while the power at the second designated wireless power level is being transferred via the first and second wireless power circuits, transmitting a second command for increasing power transferred to the first electronic device; and transferring, upon detection of a second request for the power at the first designated wireless power level from the first electronic device in response to the second command, the power at the first designated wireless power level via the first wireless power circuit. The method may include, in response to detection of a third electronic device replacing the second electronic device on the second charging pad while the power at the first designated wireless power level is being transferred via the first wireless power circuit, maintaining the transfer of the power at the first designated wireless power level via the first wireless power circuit; and transferring power at a third designated wireless power level via the second wireless power circuit. The method may include, in response to detection of the second electronic device being solitarily placed on the second charging pad, transferring the power at the second designated wireless power level via the second wireless power circuit; in response to detection of the first electronic device being placed on the first charging pad while the power at the second designated wireless power level is being transferred via the second wireless power circuit, transmitting a third command requesting transfer of the power at the second designated wireless power level to the first electronic device; and transferring, upon receipt of a third request for the power at the second designated wireless power level from the first electronic device in response to the third command, the power at the second designated wireless power level via the first and second wireless power circuits.

Figure 7:
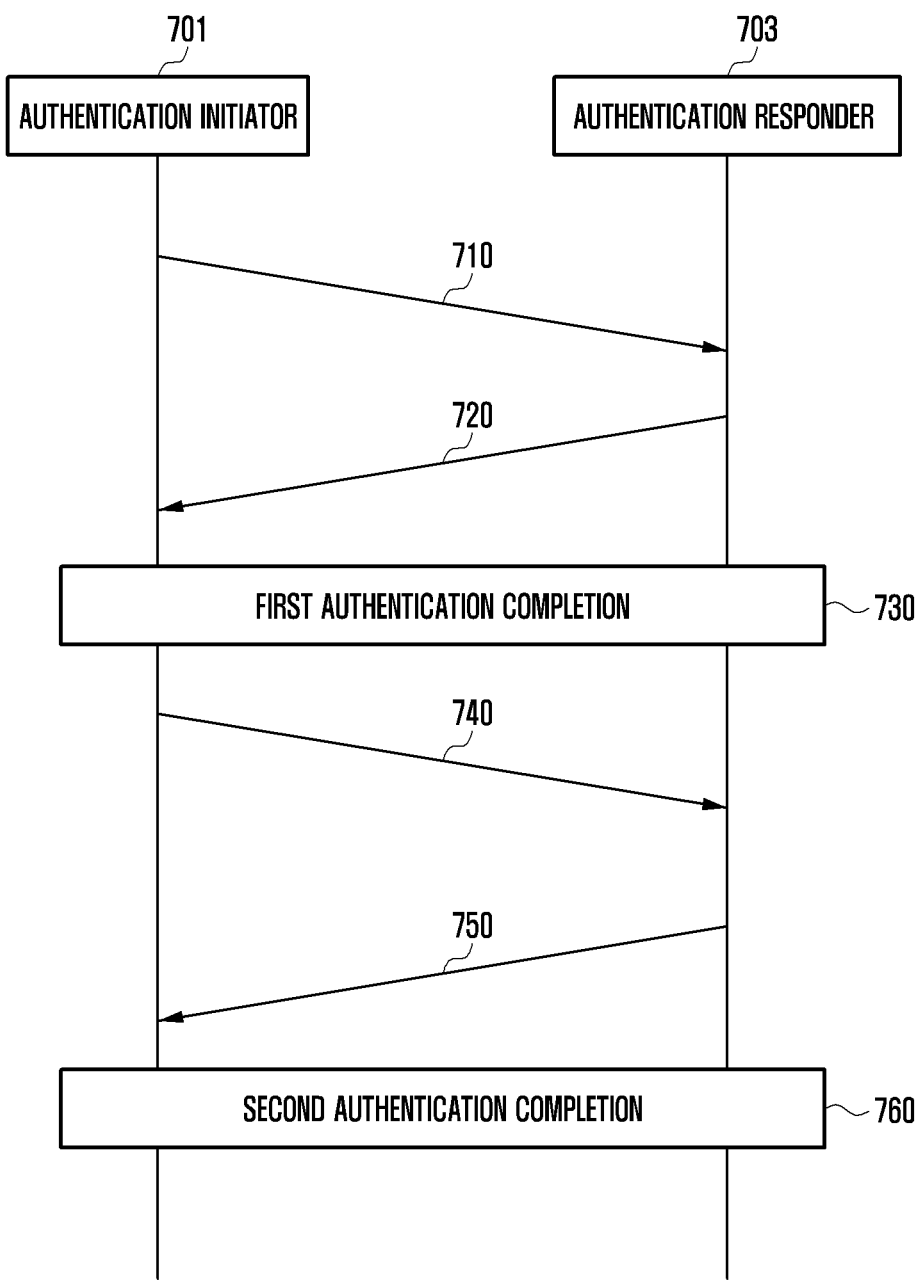
FIG. 7 is a signal flow diagram illustrating a procedure for authenticating an electronic device according to a disclosed embodiment.

FIG. 7 is a signal flow diagram 700 illustrating a procedure for authenticating an electronic device according to an embodiment.

In reference to FIG. 7, an authentication initiator 701 and an authentication responder 703 exchange authentication data. In one embodiment, an external electronic device (e.g., electronic device 101 in FIG. 1) such as a portable terminal may become the authentication initiator 701, and an electronic device 102 such as the wireless charging transmitter 302 (e.g., electronic device 102 in FIG. 1) may become an authentication responder 703. Alternatively in another embodiment, the external electronic device 101 such as a portable terminal (or wearable device) may become the authentication responder 703, and the electronic device 102 such as the wireless charging transmitter may become the authentication initiator 701. In the disclosed embodiments, descriptions are directed to the case where the external electronic device 101 such as a portable terminal is the authentication initiator 701 and the electronic device 102 such as the wireless charging transmitter is the authentication responder 703.

In the embodiment of FIG. 7, operations 710 to 730 may be a first authentication phase which is a configuration process for wireless charging at the first designated wireless power level, and operations 740 to 760 may be a second authentication phase which is a configuration or authentication process for configuring wireless charging at the second designated wireless power level. For example, the first authentication phase of operations 710 to 730 may be the configuration process for performing normal wireless charging, and the second authentication phase of operations 740 to 760 may be the configuration process for performing fast wireless charging. As another example, the first authentication phase of operations 710 to 730 may be the configuration process for performing fast wireless charging, and the second authentication phase of operations 740 to 760 may be the configuration or authentication process for performing ultra-fast wireless charging. According to an embodiment, although not shown in the drawing, if the first authentication phase of operations 710 to 730 is the configuration process for performing fast wireless charging, a configuration process for performing normal wireless charging may be performed before the first authentication phase of operations 710 to 730.

In the embodiment of FIG. 7, at least part of the first authentication phase of operations 710 to 730 may be omitted, and at least part of the second authentication phase of operations 740 to 760 may be omitted.

According to an embodiment, the first authentication phase of operations 710 to 730 may include performing in-band communication between the authentication initiator 701 and the authentication responder 703 according to a designated standard (e.g., WPC standard) such that information necessary for wireless power transfer is exchanged.

According to an embodiment, the authentication initiator 701 (e.g., electronic device) may request for identity information and/or wireless charging configuration information from the authentication responder 703 (e.g., wireless charging transmitter) at operation 710. For example, the identity information may include version information, manufacture code, or basic device identifier. The configuration information may include wireless charging frequency, the maximum allowed charging power, the required charging power amount, and/or the average power transfer amount.

According to an embodiment, the authentication responder 703 (e.g., wireless charging transmitter) may transmit the identity information and/or configuration information to the authentication initiator 701 (e.g., electronic device) at operation 720. The authentication responder 703 may create a power transfer contract for charging the authentication initiator 701 based on at least part of the transmitted identity information and/or configuration information. For example, the power transfer contract may include limits for determining power transfer characteristics. The limits may include version information of the power transfer contract, identity information of the authentication responder 703 or its manufacturer, power class, predicted maximum power information, option configuration, time information for average receiving power, or a method for determining the electric current of a main cell of the authentication responder 703.

According to an embodiment, additional information may be transmitted between the authentication initiator 701 and authentication responder 703. For example, the authentication responder 703 (e.g., wireless charging transmitter) may transmit the identity or configuration information to the authentication initiator 701 (e.g., electronic device), and the authentication initiator 701 (e.g., electronic device) may request a change in the amount of charging power based on the received configuration information. In another embodiment, the authentication initiator 701 (e.g., electronic device) may request the authentication responder 703 (e.g., wireless charging transmitter) for identity or configuration information for fast charging, and the authentication responder 703 (e.g., wireless charging transmitter) may change the amount of power to be transmitted according to the request. As another example, the authentication initiator 701 (e.g., electronic device) may requests to control the power transmission based on the identity or configuration information transmitted by the authentication responder 703 (e.g., wireless charging transmitter), and the authentication responder 703 (e.g., wireless charging transmitter) may configure (change) the power amount.

According to an embodiment, the authentication initiator 701 (e.g., electronic device) may determine whether wireless charging is available based on the identity information and/or the wireless charging configuration information received from the authentication responder 703 (e.g., wireless charging transmitter) at operation 730. The authentication initiator 701 (e.g., electronic device) may verify the wireless charging availability and complete the first authentication.

According to an embodiment, the authentication initiator 701 may request, at operation 740, the authentication responder 703 for second authentication as encrypted authentication for ultra-fast wireless charging. According to an embodiment, the second authentication may require security higher than that for the first authentication. For example, the second authentication may be performed by exchanging pre-agreed encryption information between the authentication initiator 701 and the authentication responder 703.

For example, the authentication initiator 701 may request to the authentication responder 703 for transmission of a certificate chain. The certificate chain may include public authentication message information corresponding to various root organizations that provide authentication security system (e.g., wireless power consortium (WPC)), a manufacturer authenticated by the root organization, and an individual product (e.g., wireless charging transmitter) of the manufacturer. The individual public authentication message may be uniquely paired with a private authentication message that is encrypted via the authentication security system. The private authentication message may be used to encrypt or decrypt individual message data at each of the paired electronic devices for authentication (e.g., power transmitter-power receiver pair). That is, the certificate chain may include information on three kinds of public authentication messages. Such a certificate chain may be paired with the three kinds of private authentication messages corresponding to the public authentication message. Because the wireless charging authentication produces a large amount of data of the certificate chain, it may be necessary to segment wireless charging authentication data to be transmitted.

According to an embodiment, the authentication responder 703 may transmit the certificate chain to the authentication initiator 701 at operation 750 in response to the second authentication request. For example, the authentication responder 703 may transmit the information on the certificate chain to the authentication initiator 701 by segmenting the wireless charging authentication data using various start tags and end tags.

According to an embodiment, the authentication initiator 701 may verify at operation 760 whether the received certificate chain is valid. For example, if it is determined that the certificate chain is invalid, the authentication initiator 701 may determine that the second authentication has failed and the authentication initiator 701 will be charged with low power (e.g., at the second designated wireless power level) from the authentication responder 703. In this manner, the authentication initiator 701 may be charged in the normal wireless charging mode or the fast wireless charging mode. If it is determined that the certificate chain is valid, the authentication initiator 701 may be charged with a high power (e.g., at the first designated wireless power level) from the authentication responder 703. In this manner, the authentication initiator 701 may be charged in the ultra-fast wireless charging mode.

Figure 8:
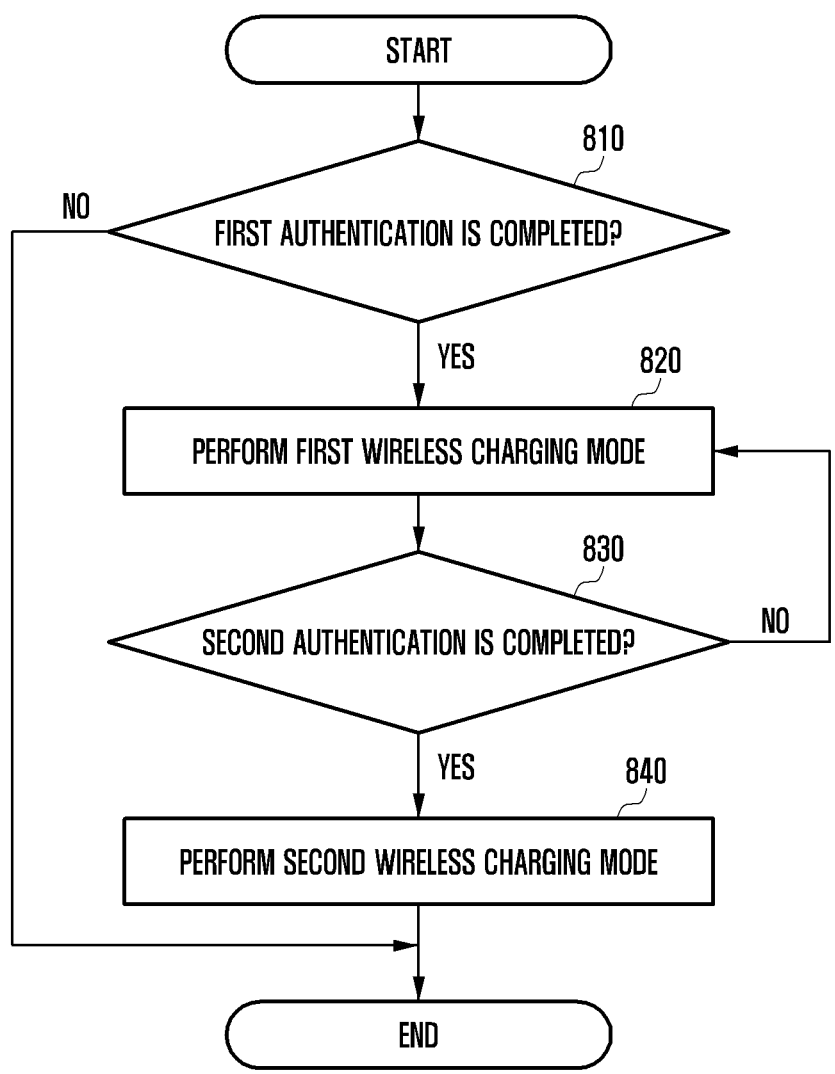
FIG. 8 is a flowchart illustrating a method for performing different power transmission/reception modes according to an authentication level of an electronic device according to a disclosed embodiment.

FIG. 8 is a flowchart 800 illustrating a method for performing different power transmission/reception modes according to an authentication level of an electronic device according to an embodiment.

According to an embodiment, the electronic device 101 (e.g., portable terminal) and the external electronic device 102 (e.g., wireless charging transmitter) may determine at operation 810 whether first authentication for wireless charging is completed. For example, the electronic device 101 may determine whether wireless charging is available based on identity information and/or wireless charging configuration information received from the external electronic device 102. The electronic device 101 may complete the first authentication by determining that wireless charging is available from the external electronic device 102. The first authentication at operation 810 may be identical or similar to operations 710 to 730 of FIG. 7.

According to an embodiment, if it is determined at operation 810 that the first authentication is completed (determination result=YES), the electronic device 101 (e.g., portable terminal) and the external electronic device 102 (e.g., wireless charging transmitter) activate, at operation 820, a first wireless charging mode corresponding to the normal wireless charging mode or the fast wireless charging mode. For example, the electronic device 101 may request to the external electronic device 102 for transfer power at the second designated wireless power level (e.g. relatively low power).

According to an embodiment, the electronic device 101 may send a request, at operation 830, to the external electronic device 102 for second authentication for ultra-fast wireless charging. The second authentication at operation 830 may be identical or similar to operations 740 to 760 of FIG. 7.

According to an embodiment, if it is determined at operation 830 that the second authentication for the ultra-fast wireless charging is completed (e.g., determination result=YES), the electronic device 101 (e.g., portable terminal) and the external electronic device 102 (e.g., wireless charging transmitter) may activate, at operation 840, a second wireless charging mode corresponding to the ultra-fast charging mode. For example, the electronic device 101 may send a request to the external electronic device 102 for transfer power at the first designated wireless power level (e.g. relatively high power).

According to an embodiment, if it is determined at operation 830 that the second authentication for ultra-fast wireless charging has failed (e.g., determination result=NO), the electronic device 101 (e.g., mobile terminal) and the external electronic device 102 may activate, at operation 820, the first wireless charging mode corresponding to the normal wireless charging mode or the fast wireless charging mode.

Figure 9:
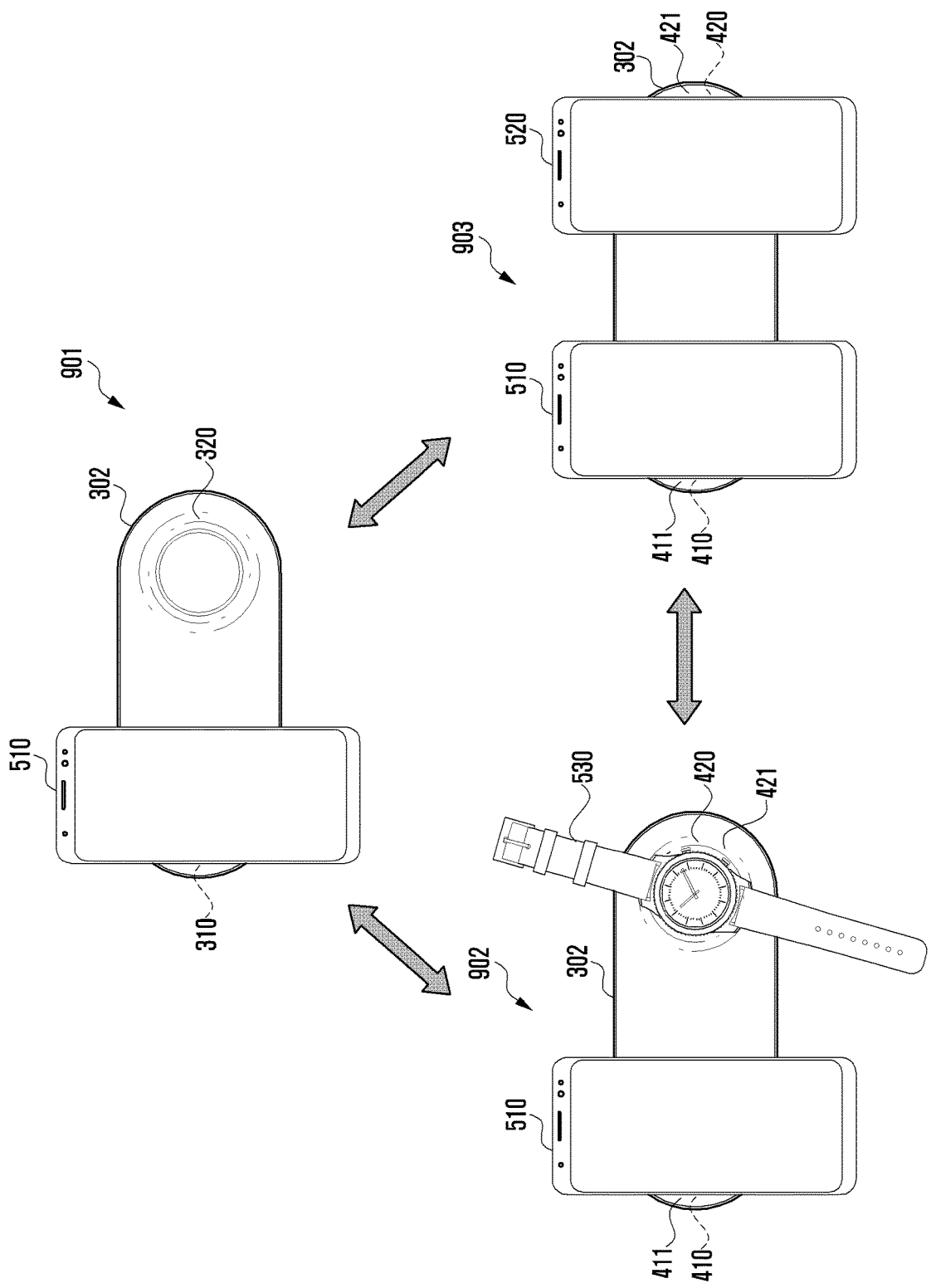
FIG. 9 is a top plan view for explaining an operation of a wireless charging transmitter depending on the state where various wireless charging receivers are placed on multiple charging pads of the wireless charging transmitter 302 according to a disclosed embodiment.

FIG. 9 is top plan views for explaining an operation of a wireless charging transmitter 302 depending on the state where various wireless charging receivers are placed on multiple charging pads of the wireless charging transmitter 302 according to an embodiment.

In the embodiment of FIG. 9, examples include a first state where a first external electronic device 510 is solitarily placed on a first charging pad 410 of the wireless charging transmitter 302, a second state where the first external electronic device 510 is placed on the first charging pad 410 of the wireless charging transmitter 302 and, simultaneously, a third external electronic device 530 different from the first external electronic device 510 is placed on a second charging pad 420 of the wireless charging transmitter 302, and a third state where the first external electronic device 510 is placed on the first charging pad 410 of the wireless charging transmitter 302 and, simultaneously, a second external electronic device 520 similar to the first external electronic device 510 is placed on the second charging pad 420 of the wireless charging transmitter 302.

First State 901

According to an embodiment, the wireless charging transmitter 302 may detect the first external electronic device 510 being solitarily placed on the first charging pad 410. According to an embodiment, the control circuit 312 of the wireless charging transmitter 302 may perform an authentication procedure with the first external electronic device 510 for a designated protocol. For example, the authentication procedure for the designated protocol may be identical or similar to the authentication procedure described with reference to FIG. 7. According to an embodiment, the authentication procedure for the designated protocol may include initiating, at the control circuit 312 of the wireless charging transmitter 302, wireless charging with the first external electronic device 510 via the first charging pad 410 and performing additional authentication using encryption information. According to an embodiment, if the authentication procedure with the electronic device for the designated protocol is completed, the wireless charging transmitter 302 may transfer power at the first designated wireless power level via the first wireless power circuit 411 of the first charging pad 410. As a consequence, the first external electronic device 501 may be able to charge its battery in the ultra-fast wireless charging mode.

According to an embodiment, the wireless charging transmitter 302 may detect whether a device is placed on the second charging pad 420 while power at the first designated wireless power level is being transferred via the first wireless power circuit 411 of the first charging pad 410. For example, if a device is placed on the second charging pad 420, the control circuit 312 of the wireless charging transmitter 302 may adjust the power being transferred via the first wireless power circuit 411 based on the device placed on the second charging pad 420. As another example, if a device is placed on the second charging pad 420, the control circuit 312 of the wireless charging transmitter 302 may determine whether to transition from the first state to the second or third state, as shown in FIG. 9, based on the device placed on the second charging pad 420 and whether to adjust the power being transferred via the first wireless charging circuit 411 based on the transitioned state, i.e., second or third state.

According to an embodiment, the operation for the wireless charging transmitter 302 to adjust the power being transferred via the first wireless power circuit 411 may be performed as follows. First, a first command for decreasing the first designated wireless power level may be transmitted from the wireless charging transmitter 302 to the first external electronic device 510. Based on a response from the first external electronic device 510 in reply to the first command, the power transferred via the first wireless power circuit 411 may be changed from being at the first designated wireless power level to be at the second designated wireless power level. This may be done for a transition from the first state to the third state in FIG. 9. The operation for the wireless charging transmitter 302 to adjust the power being transferred via the first wireless power circuit 411 may also be performed in such a way that the wireless charging transmitter 302 maintains the first designated wireless power level being transferred via the first wireless power circuit 411. This may be done for a transition from the first state to the second state in FIG. 9.

Second State 902

According to an embodiment, the wireless charging transmitter 302 may detect the first external electronic device 510 being placed on the first charging pad 410 and simultaneously the third external electronic device 530 being placed on the second charging pad 420. For example, the control circuit 312 of the wireless charging transmitter 302 may perform an authentication procedure with the first external electronic device 510 for a designated protocol. For example, the authentication procedure for the designated protocol may be identical or similar to the authentication procedure described with reference to FIG. 7. According to an embodiment, the authentication procedure for the designated protocol may include initiating, at the control circuit 312 of the wireless charging transmitter 302, wireless charging with the first external electronic device 510 via the first charging pad 410 and performing additional authentication using encryption information. According to an embodiment, if the authentication procedure with the electronic device for the designated protocol is completed, the wireless charging transmitter 302 may transfer power at the first designated wireless power level via the first wireless power circuit 411 of the first charging pad 410. As a consequence, the first external electronic device 501 is capable of charging its battery in the ultra-fast wireless charging mode. According to an embodiment, the wireless charging transmitter 302 may transfer power at the third designated wireless power level via the second wireless power circuit 421 of the second charging pad 420 while transferring power at the first designated wireless power level via the first wireless power circuit 411 of the first charging pad 410.

According to an embodiment, the wireless charging transmitter 302 may monitor to detect detachment of the third external electronic device 530 placed on the second charging pad 420 (e.g., transition from the second state to the first state) or replacement of the third external electronic device 530 placed on the second charging pad 420 by another device, e.g., the second external electronic device 520 (e.g., transition from the second state to the third state).

According to an embodiment, the wireless charging transmitter 302 may detect whether the third external electronic device 530 placed on the second charging pad 420 is detached (e.g., transition from the second state to the first state) or whether the charging power of the third external electronic device 530 placed on the second charging pad 420 is changed (e.g., transition from the second state to the third state).

According to an embodiment, if the third external electronic device 530 placed on the second charging pad 420 is detached (e.g., transition from the second state to the first state), the wireless charging transmitter 302 may maintain the transfer of the first designated wireless power level via the first charging pad 410 and terminate the transfer of the third designated wireless power level via the second charging pad 420.

According to an embodiment, if the third external electronic device 530 placed on the second charging pad 420 is replaced by another device, e.g., the second external electronic device 520 (e.g., transition from the second state to the third state), the wireless charging transmitter 302 may decrease the power being transferred via the first wireless power circuit 411 from the first designated wireless power level to the second designated wireless power level and transfer power at a fourth designated wireless power level corresponding to the second external electronic device 520 via the second wireless power circuit 421. For example, the fourth designated wireless power level may be identical or similar to the second designated wireless power level.

According to an embodiment, if either the transition from the second state to the third state occurs as the third external electronic device 530 placed on the second charging pad 420 is replaced by another device, e.g., second external electronic device 520, or the charging power of the third external electronic device 530 is changed, the wireless charging transmitter 302 may transmit a first command decreasing power to the first external electronic device 510 and change the power being transferred to the first external electronic device 510 from the first designated wireless power level to the second designated wireless power level based on a response from the first external electronic device 510 in reply to the first command.

Third State 903

According to an embodiment, the wireless charging transmitter 302 may detect the first external electronic device 510 being placed on the first charging pad 410 and simultaneously the second external electronic device 520 being placed on the second charging pad 420. For example, the control circuit 312 of the wireless charging transmitter 302 may perform an authentication procedure with the first external electronic device 510 for a designated protocol. For example, the authentication procedure for the designated protocol may be identical or similar to the authentication procedure described with reference to FIG. 7. According to an embodiment, the authentication procedure for the designated protocol may include initiating, at the control circuit 312 of the wireless charging transmitter 302, wireless charging with the first external electronic device 510 via the first charging pad 410 and performing additional authentication using encryption information. According to an embodiment, although the authentication procedure with the electronic device for the designated protocol is completed, the wireless charging transmitter 302 may transfer power at the second designated wireless power level via the first wireless power circuit 411 of the first charging pad 410. As a consequence, the first external electronic device 510 may be able to charge its battery in the fast wireless charging mode or the normal wireless charging mode. According to an embodiment, the wireless charging transmitter 302 may transfer power at the fourth designated wireless power level via the second wireless power circuit 421 of the second charging pad 420 while transferring power at the second designated wireless power level via the first wireless power circuit 411 of the first charging pad 410. For example, the fourth designated wireless power level may be identical or similar to the second designated wireless power level. As a consequence, the second external electronic device 520 may charge its battery in the fast wireless charging mode or the normal wireless charging mode.

According to an embodiment, the wireless charging transmitter 302 may monitor to detect detachment of the second external electronic device 520 placed on the second charging pad 420 (e.g., transition from the third state to the first state) or replacement of the second external electronic device 520 placed on the second charging pad by another device, e.g., the third external electronic device 530 (e.g., transition from the third state to the second state).

According to an embodiment, if the second external electronic device 520 placed on the second charging pad 420 is detached (e.g., transition from the third state to the first state), the wireless charging transmitter 302 may transmit a second command increasing the power to the first external electronic device 510 and change the power being transferred to the first external electronic device 510 from being at the second designated wireless power level to the first designated wireless power level based on a response from the first external electronic device 510 in reply to the second command.

According to an embodiment, if the second external electronic device 520 placed on the second charging pad 420 is replaced by another device, e.g., the third external electronic device 530 (e.g., transition from the third state to the second state), the wireless charging transmitter 302 may transmit a second command increasing the power to the first external electronic device 510 and change the power being transferred to the first external electronic device 510 from being at the second designated wireless power level to the first designated wireless power level based on a response from the first external electronic device 510 in reply to the second command. As a consequence, the first external electronic device 510 may charge its battery in the ultra-fast wireless charging mode. Meanwhile, the wireless charging transmitter 302 may transfer power at the third designated wireless power level to the third external electronic device 530 via the second wireless power circuit 421.

According to an embodiment, the wireless charging transmitter 302 may adjust the transferred power based on the state transition of the external electronic device (e.g., electronic device 510, 520, or 530 in FIG. 9) being placed on the charging pad as well as the type of the external electronic device (e.g., electronic device 510, 520, or 530 in FIG. 9). For example, the state of the external electronic device (e.g., electronic device 510, 520, or 530 in FIG. 9) may be transitioned even when the battery of the external electronic device (e.g., electronic device 510, 520, or 530 in FIG. 9) is fully charged or the charging mode of the external electronic device (e.g., electronic device 510, 520, or 530 in FIG. 9) is changed based on a user input.

According to an embodiment, the wireless charging transmitter 302 may detect whether the battery of the external electronic device 510 is fully charged or the charging mode of the external electronic device 510 is changed to the normal charging mode or the fast charging mode based on a user input while transferring power at the first designated wireless power level via the first charging pad 410 in the first state 901 or the second state 902 by way of example. The wireless charging transmitter 302 may transmit, upon detection of the state transition of the first external electronic device 510, a first command decreasing the power to the first external electronic device 510 and change the power being transferred to the first external electronic device 510 from being at first designated wireless power level to the second designated wireless power level based on the response from the first external electronic device 510 in reply to the first command.

According to another embodiment, if the wireless charging transmitter 320 detects that the battery of the second external electronic device 520 is fully charged or overheated in the third state 903, it may stop transferring power at the second designated wireless power level via the second charging pad 420, transmit a second command increasing the power to the first external electronic device 510, and change the power being transferring to the first external electronic device 510 from being at the second designated wireless power level to the first designated wireless power level based on the response from the first external electronic device 510 in reply to the second command.

Figure 10:
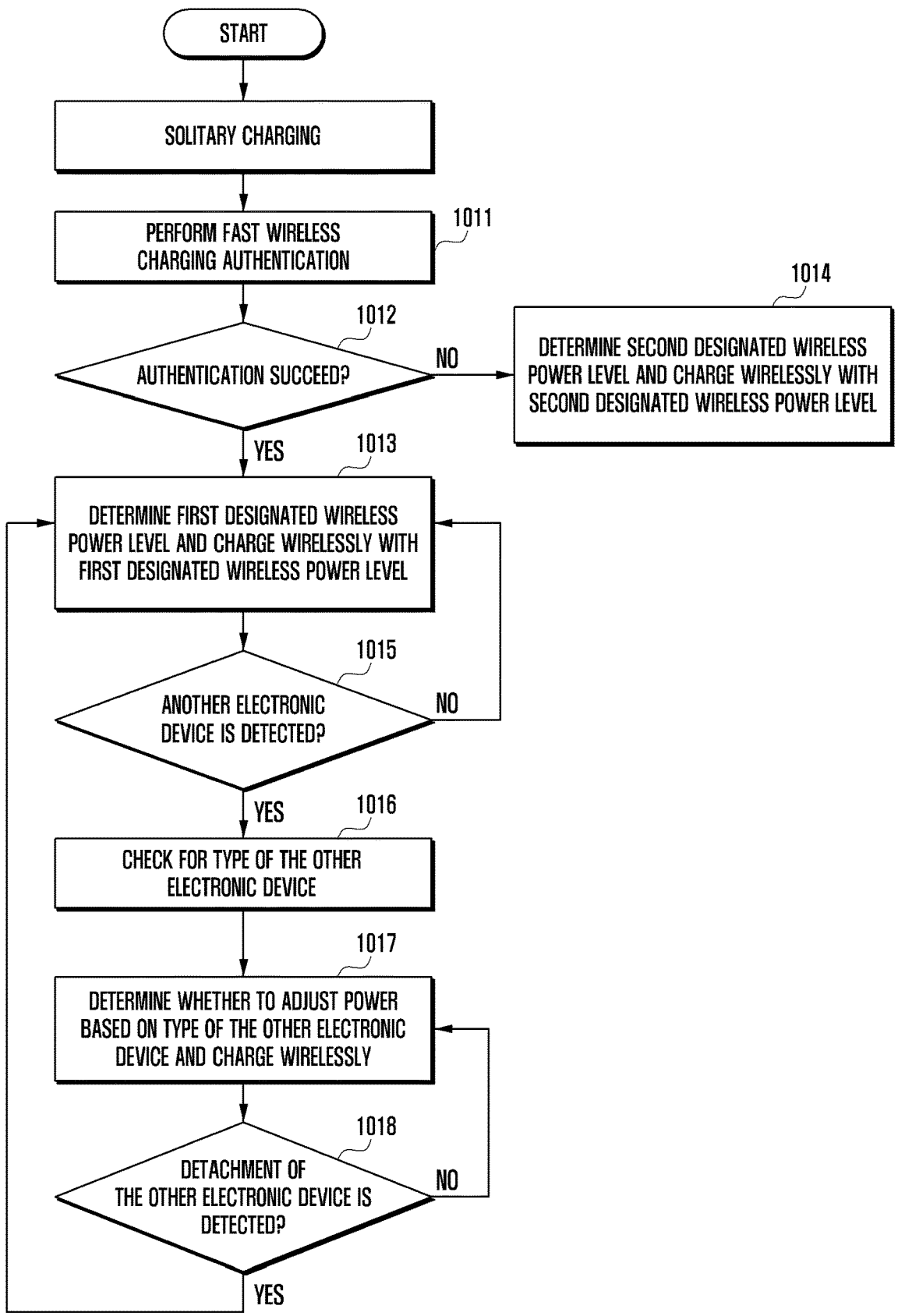
FIG. 10 is a flowchart illustrating an operation of an electronic device according to a disclosed embodiment.

FIG. 10 is a flowchart illustrating an operation of an electronic device according to a disclosed embodiment.

In the embodiment of FIG. 10, the electronic device that is solitarily placed on the first charging pad 410 of the wireless charging transmitter 302 may perform an authentication procedure for fast wireless charging at operations 1011 and 1012. According to an embodiment, the control circuit 312 of the wireless charging transmitter 302 may perform the authentication procedure with the first external electronic device 510 for a designated protocol. For example, the authentication procedure for the designated protocol may be identical or similar to the authentication procedure described with reference to FIG. 7. According to an embodiment, the authentication procedure for the designated protocol may include the wireless charging of the first external electronic device 510 via the first charging pad 410 under the control of the control circuit 312 of the wireless charging transmitter 302 and may include additional authentication using encryption information.

According to an embodiment, if the authentication procedure with the wireless charging transmitter 302 for the designated protocol succeeds (e.g., determination result at operation 1012=YES), the electronic device may charge, at operation 1013, its battery with power at the first designated wireless power level being transferred via the first wireless power circuit 411 of the first charging pad 410 in the ultra-fast wireless charging mode.

According to an embodiment, if the authentication procedure with the wireless charging transmitter 302 for the designated protocol fails (e.g., determination result at operation 1012=NO), the electronic device may transmit, at operation 1014, a request for transfer of power at the second designated wireless power level to the wireless charging transmitter 302 and charge its battery with power at the second designated wireless power level transferred via the first wireless power circuit 411 of the first charging pad 410 in the fast wireless charging mode or normal wireless charging mode.

According to an embodiment, the electronic device may detect, at operations 1015 and 1016, another electronic device being placed on the wireless charging transmitter 302 while it charges its battery with power at the first designated wireless power level from the wireless charging transmitter 302 in the ultra-fast wireless charging mode. For example, the electronic device may determine that another electronic device is being placed on the wireless charging transmitter 302 based on receipt of data from the wireless charging transmitter 302.

According to an embodiment, the electronic device checks for the type of the other electronic device placed on the charging pad 302 at operation 1016 and determines at operation 1017 whether to adjust its battery charging power based on the type of the other electronic device.

According to an embodiment, the wireless charging transmitter 302 may adjust the power being transferred to the external electronic device based on how the various external electronic devices (e.g., electronic device 510, 520, or 530 in FIG. 9) are placed on the charging pad as well as the types of the external electronic devices (e.g., electronic device 510, 520, or 530 in FIG. 9). For example, the state of the external electronic device (e.g., electronic device 510, 520, or 530 in FIG. 9) may transition even when the battery of the external electronic device (e.g., electronic device 510, 520, or 530 in FIG. 9) is fully charged or the overheated state of the external electronic device or the charging mode of the external electronic device (e.g., electronic device 510, 520, or 530 in FIG. 9) is changed based on a user input.

According to an embodiment, if a first command decreasing the charging power is received from the wireless charging transmitter 302, the electronic device determines that the other electronic device placed on the wireless charging transmitter 302 is similar to the electronic device, transmits a request for transfer of power at the second designated wireless power level to the wireless charging transmitter 302, and charges its battery with power at the second designated wireless power level (i.e. charged in the fast wireless charging mode or the normal wireless charging mode).

According to an embodiment, the electronic device may detect, at operation 1018, detachment of the other electronic device while charging its own battery in the fast wireless charging mode or the normal wireless charging mode. For example, if a second command increasing the wireless power is received from the wireless charging transmitter 302, the electronic device determines that the other electronic device placed on the wireless charging transmitter 302 is detached (e.g., determination result of operation 1018=YES). If so, the electronic device transmits a request for transfer of power at the first designated wireless power level to the wireless charging transmitter 302, and charges its own battery with power at the first designated wireless power level transferred via the first wireless power circuit 411 of the first charging pad 410 in the ultra-fast wireless charging mode at operation 1013.

Figure 11:
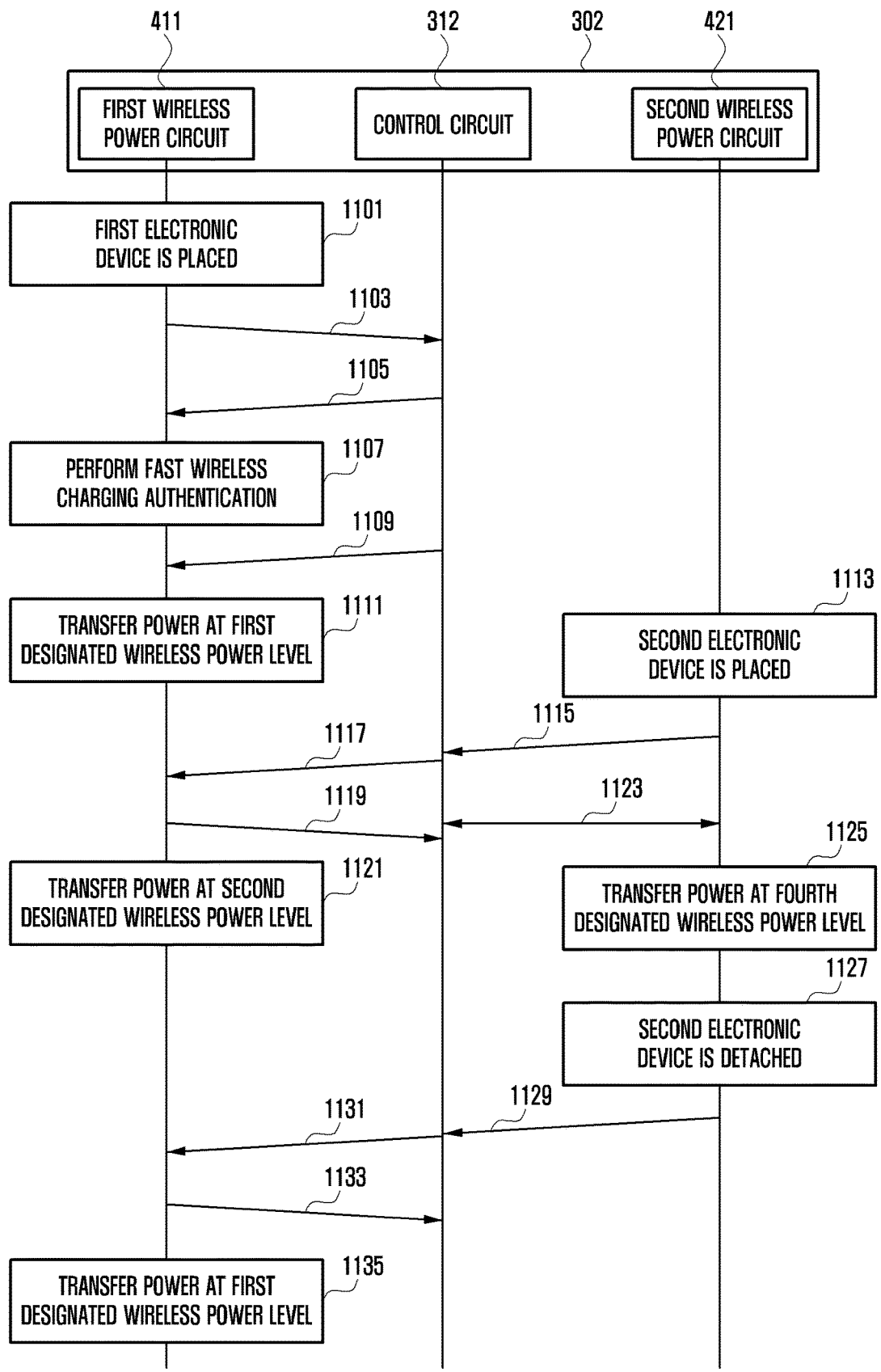
FIG. 11 is a signal flow diagram illustrating an operation of a wireless charging system according to a disclosed embodiment.

FIG. 11 is a signal flow diagram illustrating an operation of a wireless charging system according to a disclosed embodiment.

In the embodiment of FIG. 11, if the first external electronic device 510 is placed on the first charging pad 410 of the wireless charging transmitter 302, the first wireless power circuit 411 may detect the placement of the first external electronic device 510 at operation 1101 and send a signal indicative of the placement of the first external electronic device 510 to the control circuit 312 at operation 1103.

According to an embodiment, the control circuit 312 of the wireless charging transmitter 302 may perform, at operations 1105 and 1107, an authentication procedure with the first external electronic device 510 for a designated protocol upon receipt of the signal indicative of the placement of the first external electronic device 510. For example, the authentication procedure for the designated protocol may be identical or similar to the authentication procedure described with reference to FIG. 7. According to an embodiment, the authentication procedure for the designated protocol may include performing wireless charging with the first external electronic device 510 via the first charging pad 410 and performing additional authentication using encryption information.

According to an embodiment, if the authentication procedure with the first external electronic device 510 for the designated protocol is completed, the control circuit 312 of the wireless charging transmitter 302 may transfer, at operations 1109 and 1111, power at the first designated wireless power level via the first wireless power circuit 411 of the first charging pad 410. As a consequence, the first external electronic device 501 may charge its battery in the ultra-fast wireless charging mode.

According to an embodiment, if the second external electronic device 520 is placed on the second charging pad 420 of the wireless charging transmitter 302, the second wireless power circuit 421 may detect the placement of the second external electronic device 520 at operation 1113 and send a signal indicative of the placement of the second external electronic device 520 to the control circuit 312 at operation 1115. For example, the second external electronic device 520 may be a device requiring the same power as the first external electronic device 510. For example, the second external electronic device 520 may be similar to the first external electronic device 510. This may mean that the second external electronic device 520 may be a device, like the first external electronic device 510, that can be charged with a relatively high power.

According to an embodiment, the control circuit 312 of the wireless charging transmitter 302 may transmit, at operation 1117, a first command decreasing the wireless power to the first external electronic device 510 upon detection of the placement of the second external electronic device 520 on the second charging pad 420.

According to an embodiment, the control circuit 312 of the wireless charging transmitter 302 may change, at operations 1119 and 1121, the power being transferred to the first electronic device from the first designated wireless power level to the second designated wireless power level based on the response from the first external electronic device 510 in reply to the first command. As a consequence, the first external electronic device 510 may charge its battery in the fast wireless charging mode or the normal wireless charging mode.

According to an embodiment, the control circuit 312 of the wireless charging transmitter 302 may transmit, at operations 1123 and 1125, a request for configuration of the fourth designated wireless power level to the second external electronic device 520 and transfer power at the fourth designated wireless power level upon receipt of a response from the second external electronic device 520 in response to the request. For example, the fourth designated wireless power level may be identical or similar to the second designated wireless power level. As a consequence, the second external electronic device 520 may charge its battery in the fast wireless charging mode or the normal wireless charging mode.

According to an embodiment, if the second external electronic device 520 is detached from the second charging pad 420 of the wireless charging transmitter 302, the second wireless power circuit 421 may detect the detachment of the second external electronic device 520 at operation 1127 and send a signal indicative of the detachment of the second external electronic device 520 to the control circuit 312 at operation 1129.

According to an embodiment, the control circuit 312 of the wireless charging transmitter 302 may transmit a second command increasing the wireless power to the first external electronic device 510 at operation 1131 upon detection of the detachment of the second external electronic device 520 from the second charging pad 420.

According to an embodiment, the control circuit 312 of the wireless charging transmitter 302 may change, at operations 1133 and 1135, the power being transferred to the first external electronic device 510 from the second designated wireless power level to the first designated wireless power level based on the response from the first external electronic device 510 in reply to the second command. As a consequence, the first external electronic device 510 may charge its battery in the ultra-fast wireless charging mode.

Figure 12:
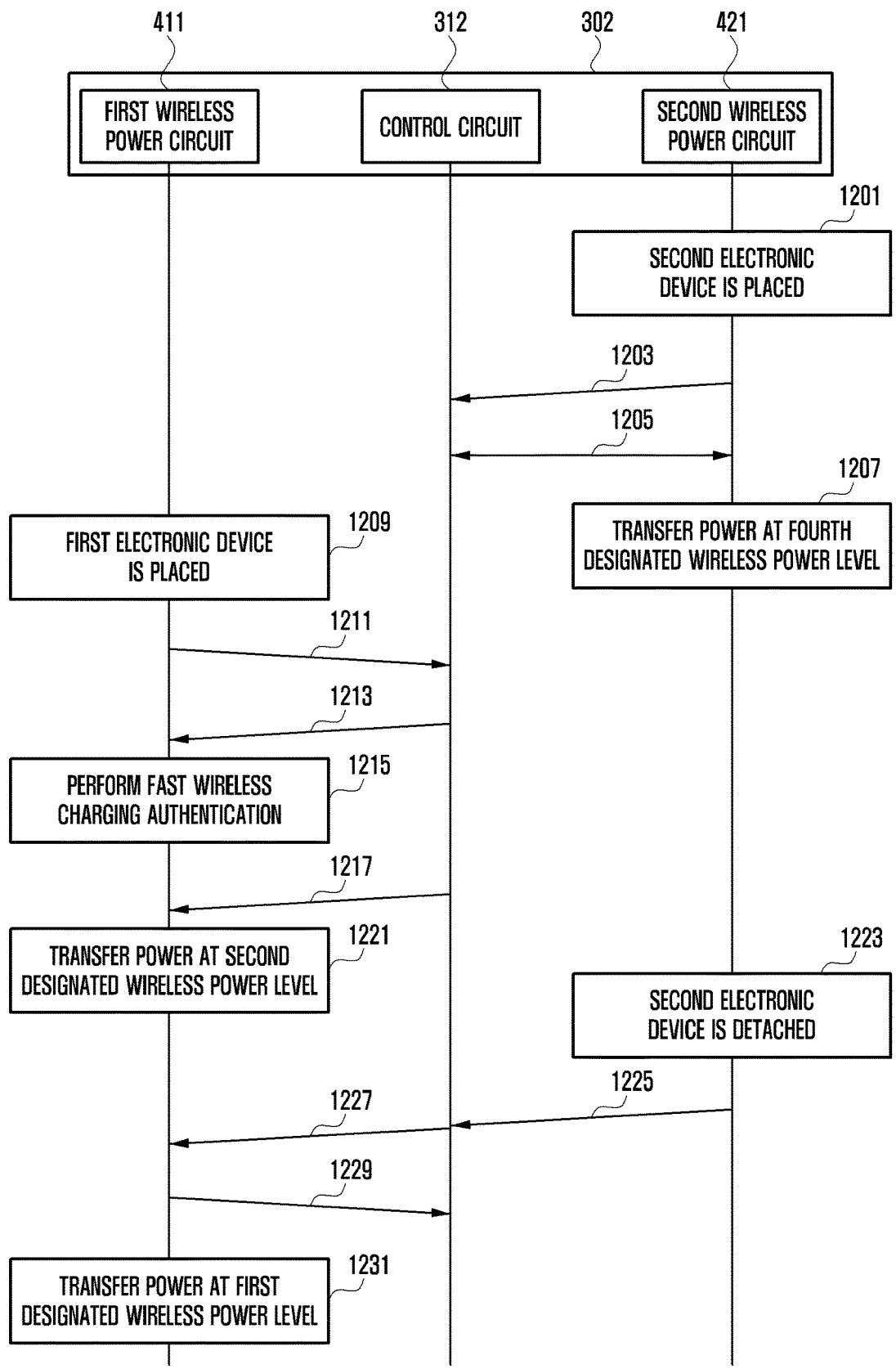
FIG. 12 is a signal flow diagram illustrating an operation of a wireless charging system according to another disclosed embodiment.

FIG. 12 is a signal flow diagram illustrating an operation of a wireless charging system according to another disclosed embodiment.

In the embodiment of FIG. 12, if the second external electronic device 520 is placed on the second charging pad 420 of the wireless charging transmitter 302, the second wireless power circuit 421 may detect the placement of the second external electronic device 520 at operation 1201 and send a signal indicative of the placement of the second external electronic device 520 to the control circuit 312 at operation 1203. For example, the second external electronic device 520 may be a device that can be charged with a relatively high power.

According to an embodiment, the control circuit 312 of the wireless charging transmitter 302 may transmit, at operations 1205 and 1207, a request for configuration of the fourth designated wireless power level to the second external electronic device 520 and transfer power at the fourth designated wireless power level upon receipt of a response from the second external electronic device 520 in reply to the request. As a consequence, the second external electronic device 520 may charge its battery in the fast wireless charging mode or the normal wireless charging mode.

According to an embodiment, if the first external electronic device 510 is placed on the first charging pad 410 of the wireless charging transmitter 302, the first wireless power circuit 411 may detect the placement of the first external electronic device 510 on the first charging pad 410 at operation 1209 and send a signal indicative of the placement of the first external electronic device 510 to the control circuit 312 at operation 1211.

According to an embodiment, the control circuit 312 of the wireless charging transmitter 302 may perform, at operations 1213 and 1215, an authentication procedure with the first external electronic device 510 for a designated protocol upon receipt of the signal indicative of the placement of the first external electronic device 510. For example, the authentication procedure for the designated protocol may be identical or similar to the authentication procedure described with reference to FIG. 7. According to an embodiment, the authentication procedure for the designated protocol may include performing wireless charging with the first external electronic device 510 via the first charging pad 410 or performing additional authentication using encryption information.

According to an embodiment, if the authentication procedure with the first external electronic device 510 for the designated protocol is completed, the control circuit 312 of the wireless charging transmitter 302 may transfer, at operations 1217 and 1221, power at the second designated wireless power level via the first wireless power circuit 411 of the first charging pad 410. As a consequence, the first external electronic device 510 may charge its battery in the fast wireless charging mode or the normal wireless charging mode. That is, the control circuit 312 of the wireless charging transmitter 302 may transfer power at the second designated wireless power level via the first wireless power circuit 411 of the first charging pad 410 even after the authentication procedure with the first external electronic device 510 is completed. As a consequence, the first external electronic device 510 may charge its battery in the fast wireless charging mode or the normal wireless charging mode.

According to an embodiment, if the second external electronic device 520 is detached from the second charging pad 420 of the wireless charging transmitter 302, the second wireless power circuit 421 may detect the detachment of the second external electronic device 520 at operation 1223 and send a signal indicative of the detachment of the second external electronic device 520 to the control circuit 312 at operation 1225.

According to an embodiment, the control circuit 312 of the wireless charging transmitter 302 may transmit, at operation 1227, a second command increasing the wireless power to the first external electronic device 510 upon detection of detachment of the second external electronic device 520 from the second charging pad 420.

According to an embodiment, the control circuit 312 of the wireless charging transmitter 302 may change, at operations 1229 and 1231, the power being transferred to the first external electronic device 510 from being at the second designated wireless power level to the first designated wireless power level based on a response from the first external electronic device 510 in reply to the second command. As a consequence, the first external electronic device 510 may charge its battery in the ultra-fast wireless charging mode.

As described above, the wireless charging transmitters and methods of the disclosed embodiments are advantageous in terms of facilitating and stabilizing wireless charging by determining a receiving power level of an electronic device based on at least the presence/absence of an electronic device placed on a charging pad, the type of the electronic device placed on the charging pad, and the headroom of available power.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of, the items enumerated together in a corresponding one of the phrases. As used herein, such terms as "1st" and "2nd," or "first" and "second" may be used to simply distinguish a corresponding component from another, and they do not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and it may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as the memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or a similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A wireless charging transmitter comprising:
a first charging pad including a first wireless power circuit;
a second charging pad including a second wireless power circuit; and
a controller electrically connected to the first and second wireless power circuits and configured to:
in response to detection of a first electronic device being placed on the first charging pad and receiving a request for a first designated wireless power level from the first electronic device, transfer, after an authentication procedure with the first electronic device for a designated protocol is completed, power at the first designated wireless power level via the first wireless power circuit,
in response to detection of a second electronic device being placed on the second charging pad and receiving a request for the first designated wireless power level from the second electronic device while the power at the first designated wireless power level is being transferred via the first wireless power circuit, transmit a first command for decreasing power transferred to the first electronic device,
transfer, upon receipt of a request for a second designated wireless power level lower than the first designated wireless power level from the first electronic device, the power at the second designated wireless power level via each of the first and second wireless power circuits,
in response to detection of the second electronic device being solitarily placed on the second charging pad, transfer the power at the second designated wireless power level via the second wireless power circuit,
in response to detection of the first electronic device being placed on the first charging pad while the power at the second designated wireless power level is being transferred via the second wireless power circuit, transmit a third command requesting transfer of the power at the second designated wireless power level to the first electronic device, and
transfer, upon receipt of a third request for the power at the second designated wireless power level from the first electronic device in response to the third command, the power at the second designated wireless power level via each of the first and second wireless power circuits.

2. The wireless charging transmitter of claim 1, wherein the controller is further configured to:

in response to detection of a detachment of the second electronic device while the power at the second designated wireless power level is being transferred via each of the first and second wireless power circuits, transmit a second command for increasing power transferred to the first electronic device, and transfer, upon receipt of a request for the first designated wireless power level from the first electronic device in response to the second command, the power at the first designated wireless power level via the first wireless power circuit.

3. The wireless charging transmitter of claim 1, wherein the controller is further configured to:

in response to detection of a third electronic device replacing the second electronic device on the second charging pad and receiving a request for a third designated wireless power level lower than the second designated wireless power level from the third electronic device while the power at the first designated wireless power level is being transferred via the first wireless power circuit, maintain the transfer of the power at the first designated wireless power level via the first wireless power circuit, and transfer power at the third designated wireless power level via the second wireless power circuit.

4. A wireless power transfer method of a wireless charging transmitter including a first charging pad having a first wireless power circuit and a second charging pad having a second wireless power circuit, the wireless power transfer method comprising:

when a first electronic device is solitarily placed on the first charging pad and receiving a request for a first designated wireless power level from the first electronic device, transferring, after an authentication procedure with the first electronic device for a designated protocol is completed, power at the first designated wireless power level via the first wireless power circuit;

in response to detection of a second electronic device being placed on the second charging pad and receiving a request for the first designated wireless power level from the second electronic device while the power at the first designated wireless power level is being transferred via the first wireless power circuit, transmitting a first command for decreasing power transferred to the first electronic device;

transferring, upon receipt of a first request for a second designated wireless power level lower than the first designated wireless power level from the first electronic device, the power at the second designated wireless power level via each of the first and second wireless power circuits;

in response to detection of the second electronic device being solitarily placed on the second charging pad, transferring the power at the second designated wireless power level via the second wireless power circuit;

in response to detection of the first electronic device being placed on the first charging pad while the power at the second designated wireless power level is being transferred via the second wireless power circuit, transmitting a third command requesting transfer of the power at the second designated wireless power level to the first electronic device; and transferring, upon receipt of a third request for the power at the second designated wireless power level from the first electronic device in response to the third command, the power at the second designated wireless power level via each of the first and second wireless power circuits.

5. The wireless power transfer method of claim 4, further comprising:

in response to detection of a detachment of the second electronic device while the power at the second designated wireless power level is being transferred via each of the first and second wireless power circuits, transmitting a second command for increasing power transferred to the first electronic device; and transferring, upon detection of a request for the first designated wireless power level from the first electronic device in response to the second command, the power at the first designated wireless power level via the first wireless power circuit.

6. The wireless power transfer method of claim 4, further comprising:

in response to detection of a third electronic device replacing the second electronic device on the second charging pad and receiving a request for a third designated wireless power level lower than the second designated wireless power level from the third electronic device while the power at the first designated wireless power level is being transferred via the first wireless power circuit, maintaining the transfer of the power at the first designated wireless power level via the first wireless power circuit; and transferring power at the third designated wireless power level via the second wireless power circuit.

* * * * *